United States Patent
Kneckt et al.

(10) Patent No.: US 11,533,132 B2
(45) Date of Patent: Dec. 20, 2022

(54) LINK-SPECIFIC BLOCK ACKNOWLEDGMENT FOR MULTI-LINK COMMUNICATION

(71) Applicant: Apple Inc., Cupertino, CA (US)

(72) Inventors: Jarkko L. Kneckt, Los Gatos, CA (US); Jinjing Jiang, San Jose, CA (US); Qi Wang, Sunnyvale, CA (US); Su Khiong Yong, Palo Alto, CA (US); Tianyu Wu, Fremont, CA (US); Yong Liu, Campbell, CA (US)

(73) Assignee: Apple Inc., Cupertino, CA (US)

( * ) Notice: Subject to any disclaimer, the term of this patent is extended or adjusted under 35 U.S.C. 154(b) by 62 days.

(21) Appl. No.: 17/133,188

(22) Filed: Dec. 23, 2020

(65) Prior Publication Data
US 2021/0211234 A1    Jul. 8, 2021

Related U.S. Application Data

(60) Provisional application No. 62/957,057, filed on Jan. 3, 2020.

(51) Int. Cl.
*H04L 1/16* (2006.01)
*H04L 5/00* (2006.01)

(52) U.S. Cl.
CPC .......... *H04L 1/1621* (2013.01); *H04L 5/0044* (2013.01)

(58) Field of Classification Search
CPC ... H04L 1/1614; H04L 1/1621; H04L 1/1685; H04L 1/1835–1845; H04L 5/0044
See application file for complete search history.

(56) References Cited

U.S. PATENT DOCUMENTS

| | | | |
|---|---|---|---|
| 2009/0252145 A1 | 10/2009 | Meylan et al. | |
| 2016/0337783 A1* | 11/2016 | Seok | H04L 1/16 |
| 2018/0205502 A1 | 7/2018 | Merlin et al. | |
| 2020/0037395 A1* | 1/2020 | Ko | H04W 80/08 |
| 2021/0051111 A1* | 2/2021 | Lee | H04L 47/14 |
| 2021/0076413 A1* | 3/2021 | Lu | H04W 74/08 |
| 2021/0084533 A1* | 3/2021 | Huang | H04W 28/16 |

FOREIGN PATENT DOCUMENTS

WO    2021/010664 A1    1/2021

* cited by examiner

*Primary Examiner* — Pao Sinkantarakorn
(74) *Attorney, Agent, or Firm* — Kowert, Hood, Munyon, Rankin & Goetzel, P.C.

(57) ABSTRACT

An electronic device that communicates frames is described. During operation, the electronic device may transmit the frames addressed to a recipient electronic device and associated with multiple links between the electronic device and the recipient electronic device. Then, the electronic device may receive block acknowledgments for at least a subset of the frames, where a given block acknowledgment is associated with the recipient electronic device and indicates received frames on a given link in the links. Moreover, the electronic device may control an amount of traffic conveyed on the links based at least in part on the block acknowledgments. Next, the electronic device may store a remainder of the frames based at least in part on the block acknowledgments, where the frames include the subset of the frames and the remainder of the frames. Note that the frames may have a common traffic identifier.

20 Claims, 29 Drawing Sheets

| NO FRAGMENTATION | HE FRAGMENTATION | LINK-SPEC. BA PARAMETERS | MPDU REORDERING | RESERVED | under# LINK-SPECIFIC BLOCK ACKNOWLEDGMENT FOR MULTI-LINK COMMUNICATION

CROSS-REFERENCE TO RELATED APPLICATION

This application claims the benefit of U.S. Provisional Application No. 62/957,057, entitled "Link-Specific Block Acknowledgment for Multi-Link Communication," by Jarkko L. Kneckt, et al., filed Jan. 3, 2020, the contents of which are hereby incorporated by reference.

FIELD

The described embodiments relate, generally, to communication of wireless signals by an electronic device, including techniques for communicating frames between an electronic device and one or more recipient electronic devices using multiple links.

BACKGROUND

Many electronic devices communicate with each other using wireless communication. For example, the communication between electronic devices may be based on a communication protocol that is compatible with an Institute of Electrical and Electronics Engineers (IEEE) standard, such as an IEEE 802.11 standard (which is sometimes referred to as 'Wi-Fi'). IEEE 802.11be introduces a multi-link concept that allows a transmitter (which is sometimes referred to as an 'electronic device') to communicate frames with one or more receivers (which are sometimes referred to as 'recipient electronic devices'). Notably, the transmitter may transmit frames having the same traffic identifier (TID) in the multiple links to the one or more receivers. However, the use of multiple links may make it more complicated for the one or more receivers to provide acknowledgments to the transmitter.

SUMMARY

In a first group of embodiments, an electronic device that communicates frames is described. This electronic device may include: a node (or a pad or a connector) that is communicatively coupled to an antenna; and an interface circuit (which is sometimes referred to as a 'communication circuit'), communicatively coupled to the node, that communicates with a recipient electronic device via multiple links between the electronic device and the recipient electronic device. During operation, the interface circuit may transmit the frames addressed to the recipient electronic device and associated with the links. Then, the interface circuit may receive block acknowledgments for at least a subset of the frames, where a given block acknowledgment is associated with the recipient electronic device and indicates received frames on a given link in the links. Moreover, the interface circuit may control an amount of traffic conveyed on the links based at least in part on the block acknowledgments. Next, the interface circuit may store a remainder of the frames based at least in part on the block acknowledgments, where the frames include the subset of the frames and the remainder of the frames.

Note that the block acknowledgments may correspond to selective reordering of at least the subset of the frames in the recipient electronic device. Moreover, the amount of traffic conveyed on the links may be controlled based at least in part on the selective reordering.

Furthermore, sizes of the frames may correspond to the selective reordering.

Additionally, the remainder of the frames may be stored in a buffer and a size of the buffer may be equal to or larger than a size of a largest block acknowledgment. In some embodiments, the same buffer size is used for all of the links.

In some embodiments, the block acknowledgments may be independent of each other.

Moreover, the amount of traffic may be controlled with at least a transmission window. For example, each link has a separate transmission window.

Furthermore, the frames may have a common traffic identifier. The interface circuit may: transmit a block-acknowledgment setup request addressed to the recipient electronic device, where the block-acknowledgment setup request is associated with the traffic identifier; and receive a block-acknowledgment setup response associated with the recipient electronic device.

Additionally, the frames may be compatible with a transmission control protocol.

Note that the frames may include: media access control (MAC)-level sequence numbers; and/or application-level sequence numbers.

In some embodiments, the frames may be associated with an aggregate-MAC protocol data unit (A-MPDU).

Moreover, the interface circuit may: transmit a block-acknowledgment request that requests the block acknowledgments; or to request the block acknowledgments by setting a bit in the frames.

Other embodiments provide the integrated circuit for use with the electronic device.

Other embodiments provide a computer-readable storage medium for use with the electronic device. When program instructions stored in the computer-readable storage medium are executed by the electronic device, the program instructions may cause the electronic device to perform at least some of the aforementioned operations of the electronic device.

Other embodiments provide a method for communicating the frames. The method includes at least some of the aforementioned operations performed by the electronic device.

Other embodiments provide a recipient electronic device. This recipient electronic device may include: a node (or a pad or a connector) that is communicatively coupled to an antenna; and a second interface circuit (which is sometimes referred to as a 'second communication circuit'), communicatively coupled to the node, that communicates with an electronic device via multiple links. During operation, the second interface circuit may receive frames associated with the electronic device and associated with the links. Then, the second interface circuit may transmit block acknowledgments for the frames, where a given block acknowledgment is addressed to the electronic device and indicates received frames on a given link in the links.

Note that the second interface circuit may selectively reorder the frames based at least in part on sequence numbers associated with the frames. Moreover, the block acknowledgments may correspond to the selective reordering.

Furthermore, the block acknowledgments may be independent of each other.

Additionally, the second interface circuit may: receive second frames associated with a second electronic device and having a source address of the electronic device; and combine the frames and the second frames. Note that the frames and the second frames may have different traffic identifiers. In some embodiments, the second interface circuit may: receive a block-acknowledgment setup request associated with the electronic device, where the block-acknowledgment setup request is associated with the traffic identifier; and transmit a block-acknowledgment setup response addressed to the electronic device.

Moreover, the amount of traffic conveyed on the links may be controlled with a transmission window. For example, each link may have a separate transmission window.

Furthermore, the frames may be compatible with a transmission control protocol.

Additionally, the frames may include: MAC-level sequence numbers; and/or application-level sequence numbers.

In some embodiments, the frames may be associated with an A-MPDU.

Note that the second interface circuit may receive a block-acknowledgment request that requests the block acknowledgments.

Moreover, the frames may include a bit that requests the block acknowledgments.

Furthermore, the recipient electronic device may: remove duplicate frames in the frames; and decrypt the frames, where the decryption may ensure that the frames correspond a consecutive sequence of packet numbers.

Additionally, the recipient electronic device may: remove duplicate frames in the frames; decrypt the frames to obtain packets; and sequentially reorder the packets based at least in part on packet numbers associated with the packets.

Other embodiments provide the second integrated circuit for use with the recipient electronic device.

Other embodiments provide a computer-readable storage medium for use with the recipient electronic device. When program instructions stored in the computer-readable storage medium are executed by the recipient electronic device, the program instructions may cause the recipient electronic device to perform at least some of the aforementioned operations of the recipient electronic device.

Other embodiments provide a method for communicating the frames. The method includes at least some of the aforementioned operations performed by the recipient electronic device.

In a second group of embodiments, an electronic device that communicates frames is described. This electronic device may include: a node (or a pad or a connector) that is communicatively coupled to an antenna; and an interface circuit (which is sometimes referred to as a 'communication circuit'), communicatively coupled to the node, that communicates with recipient electronic devices via multiple links between the electronic device and the recipient electronic devices. During operation, the interface circuit may transmit the frames addressed to the recipient electronic devices and associated with the links, where a given frame is addressed to a given recipient electronic device and is associated with a given link in the links. Then, the interface circuit may receive block acknowledgments for at least a subset of the frames, where a given block acknowledgment is associated with the given recipient electronic device and indicates received frames on the given link in the links. Moreover, the interface circuit may control an amount of traffic conveyed on the links based at least in part on the block acknowledgments. Next, the interface circuit may store a remainder of the frames based at least in part on the block acknowledgments, where the frames include the subset of the frames and the remainder of the frames.

Note that the frames may have different traffic identifiers.

Other embodiments provide the integrated circuit for use with the electronic device.

Other embodiments provide a computer-readable storage medium for use with the electronic device. When program instructions stored in the computer-readable storage medium are executed by the electronic device, the program instructions may cause the electronic device to perform at least some of the aforementioned operations of the electronic device.

Other embodiments provide a method for communicating the frames. The method includes at least some of the aforementioned operations performed by the electronic device.

Other embodiments provide a recipient electronic device. This recipient electronic device may include: a node (or a pad or a connector) that is communicatively coupled to an antenna; and a second interface circuit (which is sometimes referred to as a 'second communication circuit'), communicatively coupled to the node, that communicates with an electronic device via one or more links between the electronic device and the recipient electronic device. During operation, the second interface circuit may perform counterpart operations to the operations performed by the electronic device.

Other embodiments provide the second integrated circuit for use with the recipient electronic device.

Other embodiments provide a computer-readable storage medium for use with the recipient electronic device. When program instructions stored in the computer-readable storage medium are executed by the recipient electronic device, the program instructions may cause the recipient electronic device to perform at least some of the aforementioned operations of the recipient electronic device.

Other embodiments provide a method for communicating the frames. The method includes at least some of the aforementioned operations performed by the recipient electronic device.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing communication between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

Note that like reference numerals refer to corresponding parts throughout the drawings. Moreover, multiple instances of the same part are designated by a common prefix separated from an instance number by a dash.

DETAILED DESCRIPTION

Figure 1:
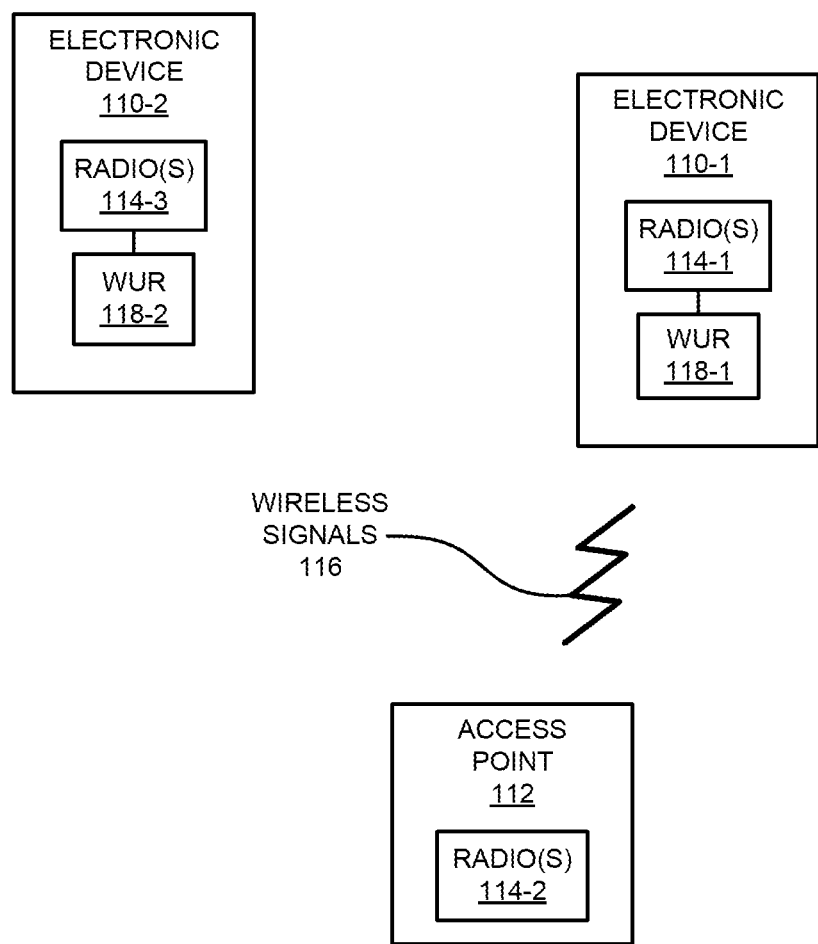
FIG. 1 is a block diagram illustrating an example of communication between electronic devices.

In a first group of embodiments, an electronic device that communicates frames is described. During operation, the electronic device may transmit the frames addressed to a recipient electronic device and associated with multiple links between the electronic device and the recipient electronic device. Then, the electronic device may receive block acknowledgments for at least a subset of the frames, where a given block acknowledgment is associated with the recipient electronic device and indicates received frames on a given link in the links. Moreover, the electronic device may control an amount of traffic conveyed on the links based at least in part on the block acknowledgments. Next, the electronic device may store a remainder of the frames based at least in part on the block acknowledgments, where the frames include the subset of the frames and the remainder of the frames. Note that the frames may have a common traffic identifier.

In a second group of embodiments, an electronic device that communicates frames is described. During operation, the electronic device may transmit the frames addressed to recipient electronic devices and associated with multiple links between the electronic device and the recipient electronic devices, where a given frame is addressed to a given recipient electronic device and is associated with a given link in the links. Then, the electronic device may receive block acknowledgments for at least a subset of the frames, where a given block acknowledgment is associated with the given recipient electronic device and indicates received frames on the given link in the links. Moreover, the electronic device may control an amount of traffic conveyed on the links based at least in part on the block acknowledgments. Next, the electronic device may store a remainder of the frames based at least in part on the block acknowledgments, where the frames include the subset of the frames and the remainder of the frames. Note that the frames may have different traffic identifiers.

By communicating the block acknowledgments, the communication techniques may allow the recipient electronic device(s) to acknowledge receipt of at least the subset of the frames. Notably, the block acknowledgments may allow the recipient electronic device(s) to efficiently acknowledge receipt of the subset of the frames, which may reduce the management overhead associated with the block acknowledgments. Moreover, by segmenting the block acknowledgments based at least in part on the different links, the communication techniques may facilitate link optimization and redirecting of traffic to better-performing links. These capabilities may facilitate improved communication performance of the electronic device and/or the recipient electronic device(s), which may improve the user experience and customer satisfaction.

Note that the communication techniques may be used during wireless communication between electronic devices in accordance with a communication protocol, such as a communication protocol that is compatible with an IEEE 802.11 standard (which is sometimes referred to as Wi-Fi). In some embodiments, the communication techniques are used with IEEE 802.11be, which is used as an illustrative example in the discussion that follows. However, this communication techniques may also be used with a wide variety of other communication protocols, and in electronic devices (such as portable electronic devices or mobile devices) that can incorporate multiple different radio access technologies (RATs) to provide connections through different wireless networks that offer different services and/or capabilities.

An electronic device can include hardware and software to support a wireless personal area network (WPAN) according to a WPAN communication protocol, such as those standardized by the Bluetooth Special Interest Group and/or those developed by Apple (in Cupertino, Calif.) that are referred to as an Apple Wireless Direct Link (AWDL). Moreover, the electronic device can communicate via: a wireless wide area network (WWAN), a wireless metro area network (WMAN), a WLAN, near-field communication (NFC), a cellular-telephone or data network (such as using a third generation (3G) communication protocol, a fourth generation (4G) communication protocol, e.g., Long Term Evolution or LTE, LTE Advanced (LTE-A), a fifth generation (5G) communication protocol, or other present or future developed advanced cellular communication protocol) and/or another communication protocol. In some embodiments, the communication protocol includes a peer-to-peer communication technique.

The electronic device, in some embodiments, can also operate as part of a wireless communication system, which can include a set of client devices, which can also be referred to as stations or client electronic devices, interconnected to an access point, e.g., as part of a WLAN, and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an IEEE 802.11 technology, such as one or more of: IEEE 802.11a; IEEE 802.11b; IEEE 802.11g; IEEE 802.11-2007; IEEE 802.11n; IEEE 802.11-2012; IEEE 802.11-2016; IEEE 802.11ac; IEEE 802.11ax, IEEE 802.11BA, IEEE 802.11be, or other present or future developed IEEE 802.11 technologies.

In some embodiments, the electronic device can act as a communications hub that provides access to a WLAN and/or to a WWAN and, thus, to a wide variety of services that can be supported by various applications executing on the electronic device. Thus, the electronic device may include an 'access point' that communicates wirelessly with other electronic devices (such as using Wi-Fi), and that provides access to another network (such as the Internet) via IEEE 802.3 (which is sometimes referred to as 'Ethernet'). However, in other embodiments the electronic device may not be an access point. As an illustrative example, in the discussion that follows the electronic device is or includes an access point.

Additionally, it should be understood that the electronic devices described herein may be configured as multi-mode wireless communication devices that are also capable of communicating via different 3G and/or second generation (2G) RATs. In these scenarios, a multi-mode electronic device or UE can be configured to prefer attachment to LTE networks offering faster data rate throughput, as compared to other 3G legacy networks offering lower data rate throughputs. For example, in some implementations, a multi-mode electronic device is configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

In accordance with various embodiments described herein, the terms 'wireless communication device,' 'electronic device,' 'mobile device,' 'mobile station,' 'wireless station,' 'wireless access point,' 'station,' 'access point' and 'user equipment' (UE) may be used herein to describe one or more consumer electronic devices that may be capable of performing procedures associated with various embodiments of the disclosure.

FIG. 1 presents a block diagram illustrating an example of electronic devices communicating wirelessly. Notably, one or more electronic devices 110 (such as a smartphone, a laptop computer, a notebook computer, a tablet, or another such electronic device) and access point 112 may communicate wirelessly in a WLAN using an IEEE 802.11 communication protocol. Thus, electronic devices 110 may be associated with or may have a connection with access point 112. For example, electronic devices 110 and access point 112 may wirelessly communicate while: detecting one another by scanning wireless channels, transmitting and receiving beacons or beacon frames on wireless channels, establishing connections (for example, by transmitting connect requests), and/or transmitting and receiving packets or frames (which may include the request and/or additional information, such as data, as payloads). Note that access point 112 may provide access to a network, such as the Internet, via an Ethernet protocol, and may be a physical access point or a virtual or 'software' access point that is implemented on a computer or an electronic device. In the discussion that follows, electronic devices 110 are sometimes referred to as 'recipient electronic devices.'

Figure 31:
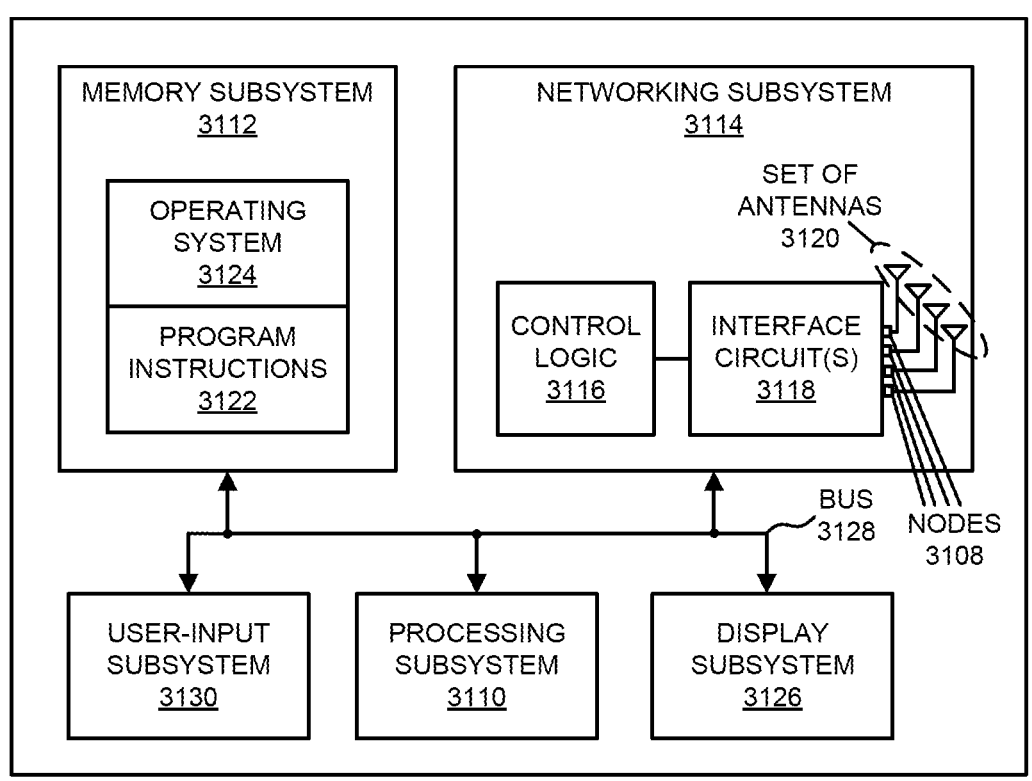
FIG. 31 is a block diagram illustrating an example of an electronic device of FIG. 1.

As described further below with reference to FIG. 31, electronic devices 110 and access point 112 may include subsystems, such as a networking subsystem, a memory subsystem, and a processor subsystem. In addition, electronic devices 110 and access point 112 may include radios 114 in the networking subsystems. More generally, electronic devices 110 and access point 112 can include (or can be included within) any electronic devices with networking subsystems that enable electronic devices 110 and access point 112, respectively, to wirelessly communicate with another electronic device. This can include transmitting beacons on wireless channels to enable the electronic devices to make initial contact with or to detect each other, followed by exchanging subsequent data/management frames (such as connect requests) to establish a connection, configure security options (e.g., IPSec), transmit and receive packets or frames via the connection, etc.

As can be seen in FIG. 1, wireless signals 116 (represented by a jagged line) are communicated by one or more radios 114-1 and 114-2 in electronic device 110-1 and access point 112, respectively. For example, as noted previously, electronic device 110-1 and access point 112 may exchange packets or frames using a Wi-Fi communication protocol in a WLAN. As illustrated further below with reference to FIGS. 2-29, one or more radios 114-1 may receive wireless signals 116 that are transmitted by one or more radios 114-2 via multiple links between electronic device 110-1 and access point 112. Alternatively, the one or more radios 114-1 may transmit wireless signals 116 that are received by the one or more radios 114-2.

In some embodiments, wireless signals 116 are communicated by one or more radios 114 in electronic devices 110 and access point 112, respectively. For example, one or more radios 114-1 and 114-3 may receive wireless signals 116 that are transmitted by one or more radios 114-2 via multiple links between electronic devices 110-1 and 110-2, and access point 112.

Note that the one or more radios 114-1 may consume additional power in a higher-power mode. If the one or more radios 114-1 remain in the higher-power mode even when they are not transmitting or receiving packets or frames, the power consumption of electronic device 110-1 may be needlessly increased. Consequently, electronic devices 110 may include wake-up radios (WURs) 118 that listen for and/or receive wake-up frames (and/or other wake-up communications), e.g., from access point 112. When a particular electronic device (such as electronic device 110-1) receives a wake-up frame, WUR 118-1 may selectively wake-up radio 114-1, e.g., by providing a wake-up signal that selectively transitions at least one of the one or more radios 114-1 from a lower-power mode to the higher-power mode.

As discussed previously, one or more of electronic devices 110 and access point 112 may communicate frames via multiple links between the one or more of electronic devices and access point 112. However, the use of multiple links may make it more complicated for the one or more electronic devices 110 to provide acknowledgments to access point 112 when they receive at least a subset of the frames. Similarly, electronic device 110-1 may communicate frames via multiple links with electronic device 110-2. However, the use of multiple links may make it more complicated for electronic device 110-2 to provide acknowledgments to electronic device 110-1 when it receives at least a subset of the frames. These difficulties may have an adverse impact on the communication performance, which may degrade the user experience and customer satisfaction.

In order to address this challenge, as described below with reference to FIGS. 2-30, in some embodiments of the disclosed communication techniques access point 112 may communicate the frames between the one or more of electronic devices 110 and access point 112 via the multiple links. Notably, access point 112 may transmit the frames addressed to one of electronic devices 110 (such as electronic device 110-1) and associated with the links. In response to receiving at least a subset of the frames, electronic device 110-1 may transmit block acknowledgments addressed to access point 112, where a given block acknowledgment is associated with electronic device 110-1 and indicates received frames on a given link in the links. Moreover, after receiving the block acknowledgments, access point 112 may control an amount of traffic conveyed on the links based at least in part on the block acknowledgments. Next, access point 112 may store a remainder of the frames based at least in part on the block acknowledgments, where the frames include the subset of the frames and the remainder of the frames.

Alternatively, access point 112 may transmit the frames addressed to electronic devices 110 and associated with the links, where a given frame is addressed to a given one of electronic devices 110 and is associated with a given link in the links. In response to receiving at least a subset of the frames, electronic devices 110 may transmit block acknowledgments addressed to access point 112, where a given block acknowledgment is associated with the given one of electronic devices 110 and indicates received frames on the given link in the links. Moreover, after receiving the block acknowledgments, access point 112 may control an amount of traffic conveyed on the links based at least in part on the block acknowledgments. Next, access point 112 may store a remainder of the frames based at least in part on the block acknowledgments, where the frames include the subset of the frames and the remainder of the frames.

In summary, the communication techniques may allow electronic devices 110 and access point 112 to efficiently acknowledge receipt of at least the subset of the frames, which may reduce management frame overhead associated with the block acknowledgments. Moreover, by segmenting the block acknowledgments based at least in part on the different links, the communication techniques may facilitate link optimization and redirecting of traffic to better-performing links. These capabilities may enable concurrent communication using the multiple links, which may facilitate improved communication performance of the electronic devices 110 and access point 112, and thus may improve the user experience and customer satisfaction.

Note that access point 112 and one or more electronic devices (such as electronic devices 110-1 and/or 110-2) may be compatible with an IEEE 802.11 standard that includes trigger-based channel access (such as IEEE 802.11ax). However, access point 112 and the one or more electronic devices may also communicate with one or more legacy electronic devices that are not compatible with the IEEE 802.11 standard (i.e., that do not use multi-user trigger-based channel access). In some embodiments, access point 112 and the one or more electronic devices use multi-user transmission (such as orthogonal frequency division multiple access or OFDMA). For example, the one or more radios 114-2 may provide one or more trigger frames for the one or more electronic devices. Moreover, in response to receiving the one or more trigger frames, the one or more radios 114-1 may provide one or more group acknowledgments to the one or more radios 114-2. For example, the one or more radios 114-1 may provide the one or more group acknowledgments during associated assigned time slot(s) and/or in an assigned channel(s) in the one or more group acknowledgments. However, in some embodiments one or more of electronic devices 110 may individually provide acknowledgments to the one or more radios 114-2. Thus, the one or more radios 114-1 (and, more generally, radios 114 in the electronic devices 110-1 and/or 110-2) may provide one or more acknowledgments to the one or more radios 114-2.

In the described embodiments, processing a packet or frame in one of electronic devices 110 and access point 112 includes: receiving wireless signals 116 encoding a packet or a frame; decoding/extracting the packet or frame from received wireless signals 116 to acquire the packet or frame; and processing the packet or frame to determine information contained in the packet or frame (such as data in the payload).

In general, the communication via the WLAN in the communication techniques may be characterized by a variety of communication-performance metrics. For example, the communication-performance metric may include any/all of: a received signal strength indicator (RSSI), a data rate, a data rate for successful communication (which is sometimes referred to as a 'throughput'), a latency, an error rate (such as a retry or resend rate), a mean-square error of equalized signals relative to an equalization target, inter-symbol interference, multipath interference, a signal-to-noise ratio (SNR), a width of an eye pattern, a ratio of a number of bytes successfully communicated during a time interval (such as a time interval between, e.g., 1 and 10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Although we describe the network environment shown in FIG. 1 as an example, in alternative embodiments, different numbers and/or types of electronic devices may be present. For example, some embodiments may include more or fewer electronic devices. As another example, in other embodiments, different electronic devices can be transmitting and/or receiving packets or frames. In some embodiments, multiple links may be used during communication between electronic devices 110. Consequently, one of electronic devices 110 may perform operations in the communication techniques. For example, in response to receiving at least a subset of the frames, electronic device 110-2 may transmit block acknowledgments addressed to electronic device 110-1, where a given block acknowledgment is associated with electronic device 110-2 and indicates received frames on a given link in the multiple links.

Figure 2:
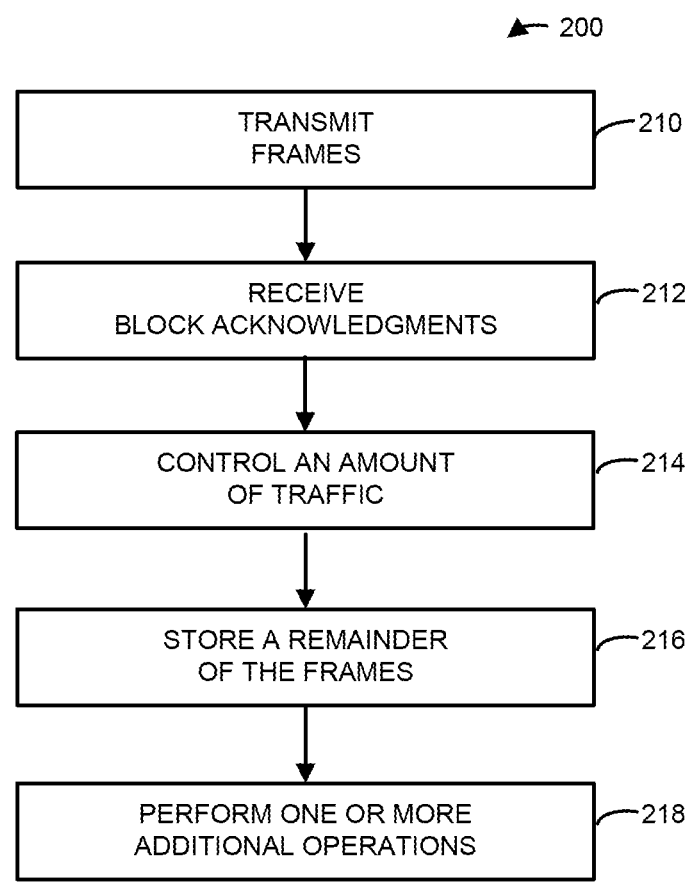
FIG. 2 is a flow diagram illustrating an example method for communicating frames using an electronic device of FIG. 1.

FIG. 2 presents a flow diagram illustrating an example method 200 for communicating frames. This method may be performed by an electronic device, such as access point 112 in FIG. 1. Note that the communication with a recipient electronic device may be compatible with an IEEE 802.11 communication protocol.

During operation, the electronic device may transmit the frames (operation 210) addressed to the recipient electronic device and associated with multiple links between the electronic device and the recipient electronic device. Moreover, the frames may be compatible with a transmission control protocol. Note that the frames may include: MAC-level sequence numbers; and/or application-level sequence numbers. In some embodiments, the frames may be associated with an A-MPDU.

Then, the electronic device may receive block acknowledgments (operation 212) for at least a subset of the frames, where a given block acknowledgment is associated with the recipient electronic device and indicates received frames on a given link in the links. In some embodiments, the block acknowledgments may be independent of each other.

Moreover, the electronic device may control an amount of traffic (operation 214) conveyed on the links based at least in part on the block acknowledgments.

Next, the electronic device may store a remainder of the frames (operation 216) based at least in part on the block acknowledgments, where the frames include the subset of the frames and the remainder of the frames.

In some embodiments, the electronic device performs one or more optional additional operations (operation 218). For example, the remainder of the frames may be stored in a buffer and a size of the buffer may be equal to or larger than a size of a largest block acknowledgment. Note that the same buffer size may be used for all of the links.

Note that the block acknowledgments may correspond to selective reordering of at least the subset of the frames in the recipient electronic device. Moreover, the amount of traffic conveyed on the links may be controlled based at least in part on the selective reordering. Furthermore, sizes of the frames may correspond to the selective reordering.

Additionally, the amount of traffic may be controlled with at least a transmission window. For example, each link has a separate transmission window.

In some embodiments, the frames may have a common traffic identifier. The electronic device may: transmit a block-acknowledgment setup request addressed to the recipient electronic device, where the block-acknowledgment setup request is associated with the traffic identifier; and receive a block-acknowledgment setup response associated with the recipient electronic device.

Moreover, the electronic device may: transmit a block-acknowledgment request that requests the block acknowledgments; or to request the block acknowledgments by setting a bit in the frames.

Figure 3:
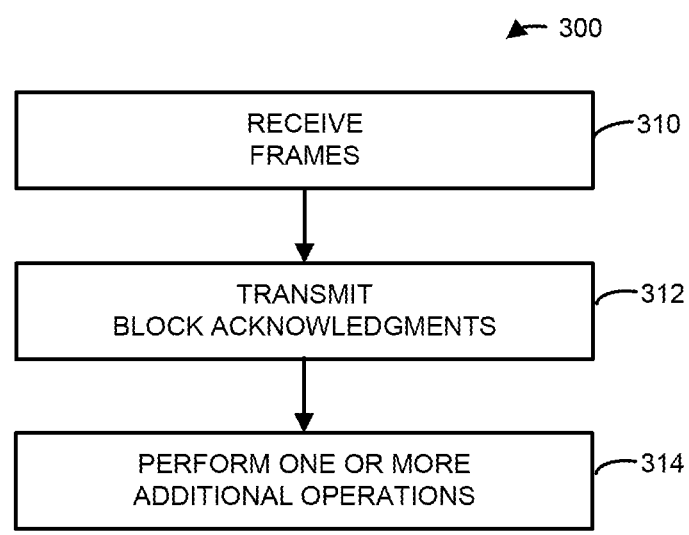
FIG. 3 is a flow diagram illustrating an example method for communicating frames using an electronic device of FIG. 1.

FIG. 3 presents a flow diagram illustrating an example method 300 for communicating frames. This method may be performed by a recipient electronic device, such as electronic device 110-1 in FIG. 1. Note that the communication with an electronic device may be compatible with an IEEE 802.11 communication protocol.

During operation, the recipient electronic device may receive frames (operation 310) associated with the electronic device and associated with multiple links between the electronic device and the recipient electronic device. Moreover, the frames may be compatible with a transmission control protocol. Note that the frames may include: MAC-level sequence numbers; and/or application-level sequence numbers. In some embodiments, the frames may be associated with an A-MPDU.

Then, the recipient electronic device may transmit block acknowledgments (operation 312) for the frames, where a given block acknowledgment is addressed to the electronic device and indicates received frames on a given link in the links. Note that the block acknowledgments may be independent of each other.

In some embodiments, the recipient electronic device performs one or more optional additional operations (operation 314). For example, the recipient electronic device may selectively reorder the frames based at least in part on sequence numbers associated with the frames. Moreover, the block acknowledgments may correspond to the selective reordering.

Furthermore, the recipient electronic device may: receive second frames associated with a second electronic device and having a source address of the electronic device; and combine the frames and the second frames. Note that the frames and the second frames may have different traffic identifiers. In some embodiments, the recipient electronic device may: receive a block-acknowledgment setup request associated with the electronic device, where the block-acknowledgment setup request is associated with the traffic identifier; and transmit a block-acknowledgment setup response addressed to the electronic device.

Additionally, the amount of traffic conveyed on the links may be controlled with a transmission window. For example, each link may have a separate transmission window.

In some embodiments, the recipient electronic device may receive a block-acknowledgment request that requests the block acknowledgments. Alternatively or additionally, the frames may include a bit that requests the block acknowledgments.

Moreover, the recipient electronic device may: remove duplicate frames in the frames; and decrypt the frames, where the decryption may ensure that the frames correspond a consecutive sequence of packet numbers. Alternatively or additionally, the recipient electronic device may: remove duplicate frames in the frames; decrypt the frames to obtain packets; and sequentially reorder the packets based at least in part on packet numbers associated with the packets.

Figure 4:
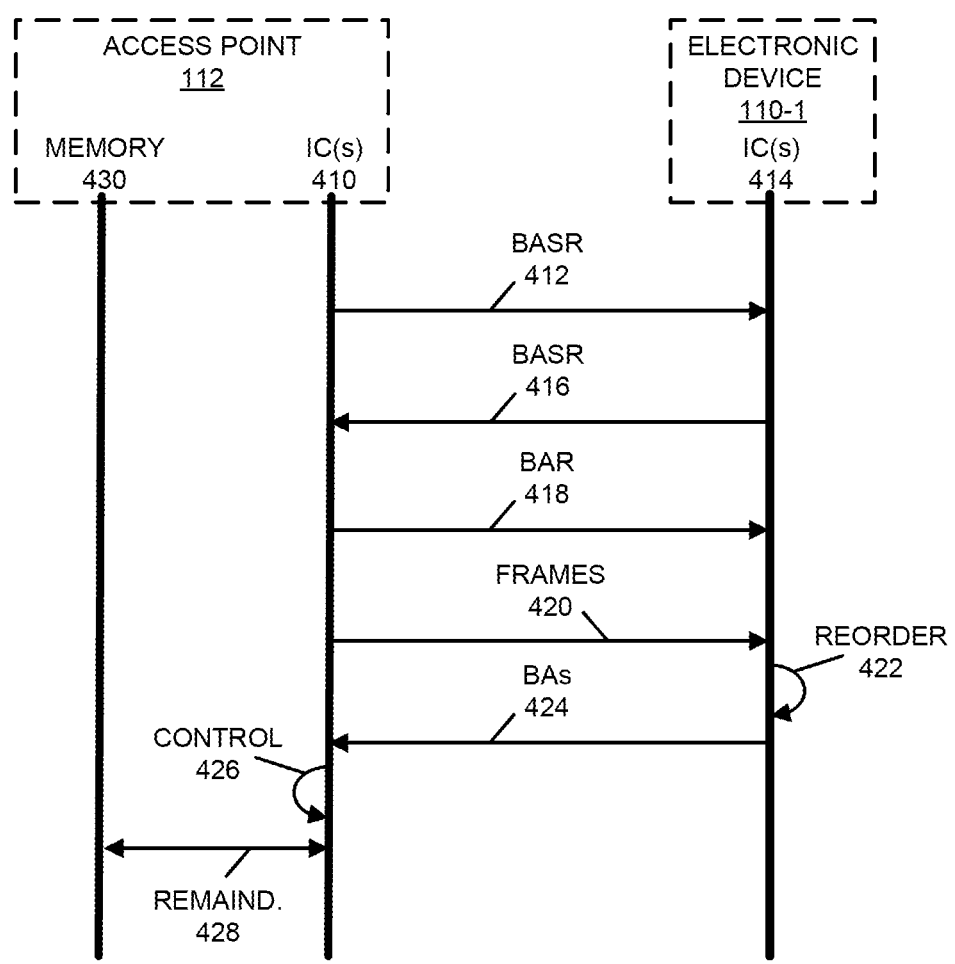
FIG. 4 is a drawing illustrating an example of communication among components in the electronic devices of FIG. 1.

The communication techniques are further illustrated in FIG. 4, which presents a flow diagram illustrating an example of communication among components in electronic device 110-1 and access point 112. During operation, one or more integrated circuits (ICs) 410 in access point 112 may transmit a block-acknowledgment setup request (BASR) 412 to electronic device 110-1, where the block-acknowledgment setup request is associated with the traffic identifier of frames 420. After receiving block-acknowledgment setup request 412, one or more integrated circuits (ICs) 414 in electronic device 110-1 may transmit a block-acknowledgment setup response (BASR) 416 to access point 112.

Alternatively or additionally, the one or more integrated circuits 410 may optionally: transmit a block-acknowledgment request (BAR) 418 that requests block acknowledgments (BA) 424; or request block acknowledgments 424 by setting a bit in frames 420.

Then, the one or more integrated circuits 410 may transmit frames 420 to electronic device 110-1 via multiple links between access point 112 and electronic device 110-1. After receiving at least a subset of frames 420, the one or more integrated circuits 414 may optionally and selectively reorder 422 at least the subset of frames 420. For example, the reordering 422 may be based at least in part on sequence numbers associated with frames 420.

Moreover, the one or more integrated circuits 414 may transmit block acknowledgments 424 for at least the subset of frames 420 to access point 112. Note that a given block acknowledgment in block acknowledgments 424 may indicated the frames that were received on a given link in the links.

Furthermore, after receiving block acknowledgments 424, the one or more integrated circuits 410 may control 426 an amount of traffic conveyed on the links based at least in part on block acknowledgments 424 and/or one or more transmission windows associated with the links. Furthermore, the one or more integrated circuits 410 may store a remainder 428 of frames 420 in memory (or a buffer) 430 in access point 112 based at least in part on block acknowledgments 424.

Figure 5:
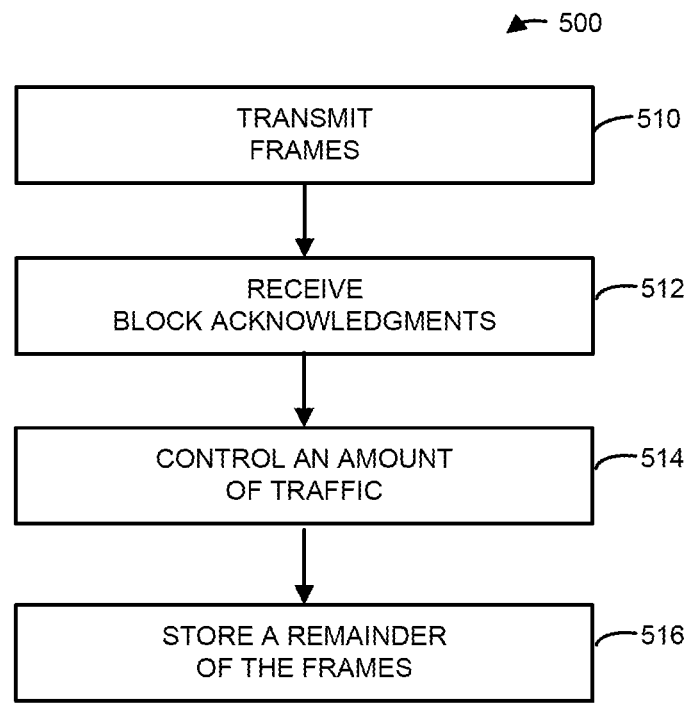
FIG. 5 is a flow diagram illustrating an example method for communicating frames using an electronic device of FIG. 1.

FIG. 5 presents a flow diagram illustrating an example method 500 for communicating frames. This method may be performed by an electronic device, such as access point 112 in FIG. 1. Note that the communication with recipient electronic devices may be compatible with an IEEE 802.11 communication protocol.

During operation, the electronic device may transmit the frames (operation 510) addressed to the recipient electronic devices and associated with multiple links between the electronic device and the recipient electronic devices, where a given frame is addressed to a given recipient electronic device and is associated with a given link in the links. Note that the frames may have different traffic identifiers.

Then, the electronic device may receive block acknowledgments (operation 512) for at least a subset of the frames, where a given block acknowledgment is associated with the given recipient electronic device and indicates received frames on the given link in the links.

Moreover, the electronic device may control an amount of traffic (operation 514) conveyed on the links based at least in part on the block acknowledgments.

Next, the electronic device may store a remainder of the frames (operation 516) based at least in part on the block acknowledgments, where the frames include the subset of the frames and the remainder of the frames.

Figure 6:
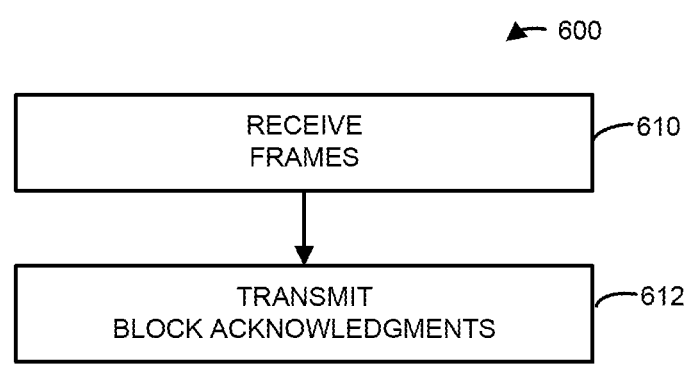
FIG. 6 is a flow diagram illustrating an example method for communicating frames using an electronic device of FIG. 1.

FIG. 6 presents a flow diagram illustrating an example method 600 for communicating frames. This method may be performed by a recipient electronic device, such as electronic device 110-1 in FIG. 1. Note that the communication with an electronic device may be compatible with an IEEE 802.11 communication protocol.

During operation, the recipient electronic device may receive the frames (operation 610) associated with the electronic device and associated with multiple links between the electronic device and one or more recipient electronic devices (which include the recipient electronic device), where a given frame is associated with a given link in the links. Note that the frames may have different traffic identifiers.

Then, the recipient electronic device may transmit block acknowledgments (operation 612) for the frames, where a given block acknowledgment is associated with the recipient electronic device and indicates received frames on the given link in the links.

In some embodiments of method 200 (FIG. 2), 300 (FIG. 3), 500 (FIG. 5) and/or 600 there may be additional or fewer operations. Further, one or more different operations may be included. Moreover, the order of the operations may be changed, and/or two or more operations may be combined into a single operation or performed at least partially in parallel.

Figure 7:
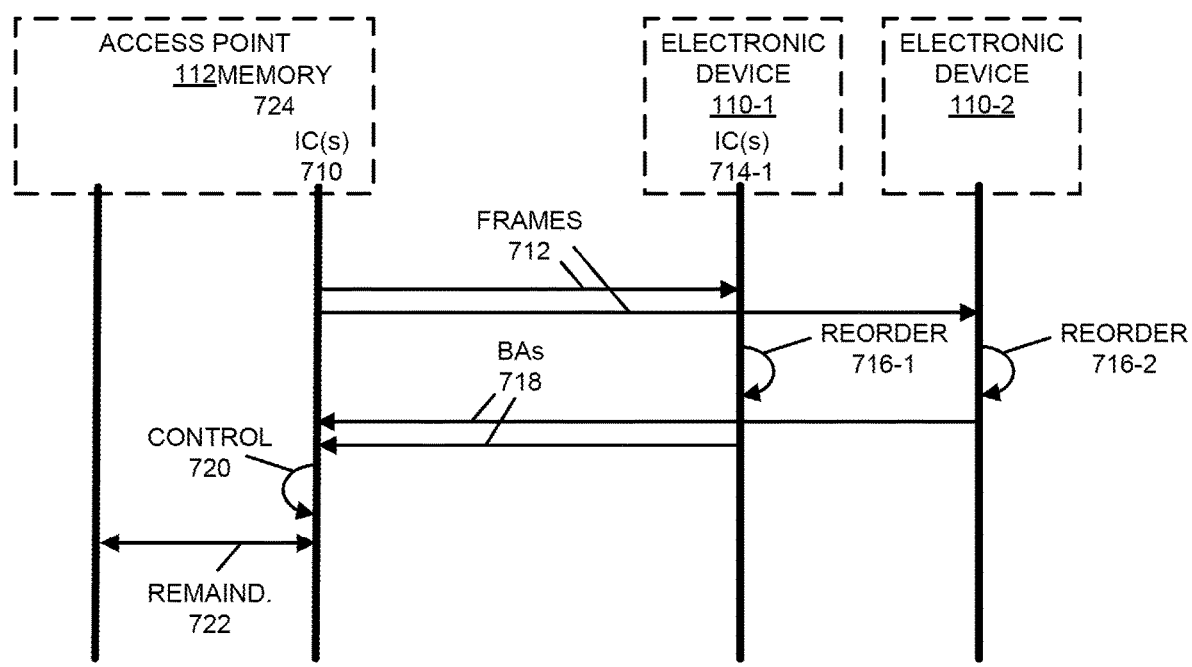
FIG. 7 is a drawing illustrating an example of communication among components in the electronic devices of FIG. 1.

The communication techniques are further illustrated in FIG. 7, which presents a flow diagram illustrating an example of communication among components in electronic devices 110 and access point 112. During operation, one or more integrated circuits 710 in access point 112 may transmit frames 712 to electronic devices 110 via multiple links between access point 112 and electronic devices 110, where a given frame is addressed to a given electronic device and is associated with a given link in the links. Note that frames 712 may have different traffic identifiers.

After receiving at least a subset of frames 712, instances of one or more integrated circuits 714 in electronic devices 110 may optionally and selectively perform one or more instances of reordering 716 at least the subset of frames 712. For example, the instance of the reordering 716 may be based at least in part on sequence numbers associated with frames 712.

Moreover, the instances of the one or more integrated circuits 714 may transmit block acknowledgments 718 for at least the subset of frames 712 to access point 112. Note that a given block acknowledgment in block acknowledgments 718 may indicated the frames that were received by a given electronic device on a given link in the links.

Furthermore, after receiving block acknowledgments 718, the one or more integrated circuits 710 may control 720 an amount of traffic conveyed on the links based at least in part on block acknowledgments 718 and/or one or more transmission windows associated with the links. Furthermore, the one or more integrated circuits 710 may store a remainder 722 of frames 712 in memory (or a buffer) 724 in access point 112 based at least in part on block acknowledgments 718.

While communication between the components in FIGS. 4 and/or 7 are illustrated with unilateral or bilateral communication (e.g., lines having a single arrow or dual arrows), in general a given communication operation may be unilateral or bilateral.

In some embodiments, the communication techniques address problems associated with multiple links between an electronic device and one or more recipient electronic devices. Notably, as discussed previously, IEEE 802.11be introduces a multi-link concept that allows one or more stations (which are sometimes referred to as 'recipient electronic devices' or 'receivers') to communicate with an access point (which is sometimes referred to as an 'electronic device' or a 'transmitter') using multiple links. More generally, an access point may be a transmitter or a recipient electronic device, and a station may be a transmitter or a recipient electronic device. In some embodiments, communication may occur between stations (e.g., device-to-device communication), instead of between an access point and a station. Note that one of the multi-link communication targets may transmit frames for the same traffic identifier (TID) in the multiple links and may acknowledge these packets.

In the following discussion, block-acknowledgment techniques that operate in a multi-link architecture are described. These block acknowledgments may provide an understanding of the block-acknowledgment states of a recipient electronic device. Note that a transmitter may limit the amount of traffic transmitted to the multiple links, so that it can be received, e.g., that it fits to a link-specific block-acknowledgment scoreboard and into a reorder buffer. Moreover, a recipient electronic device may: combine the traffic transmitted via the multiple links, may organizes the frames or MPDUs into a sequence number order, decrypt the data, and forwards packet to the Internet (or a network) or an application. Furthermore, the packet ordering may be needed for packet decryption. For example, a transmission control protocol (TCP) may require that transmitted packets are in order, otherwise the TCP may perform poorly. In some embodiments, the block-acknowledgment techniques may be used in different multi-link access-point and multi-link station configurations, such as: single-chip, multi-chip, or when there are multiple physical access points that form or provide a multi-link access point. Additionally, reorder buffering is discussed. However, the traffic may not be limited to fit into the reorder buffer.

Figure 8:
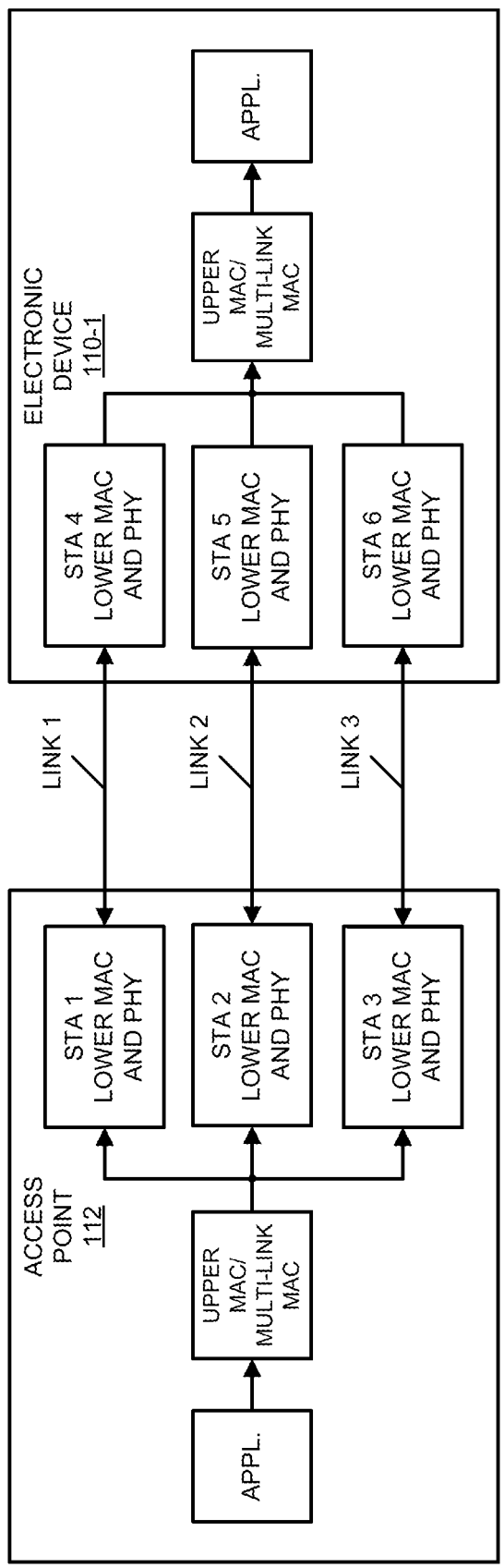
FIG. 8 is a drawing illustrating an example of communication between electronic devices of FIG. 1.
Figure 9:
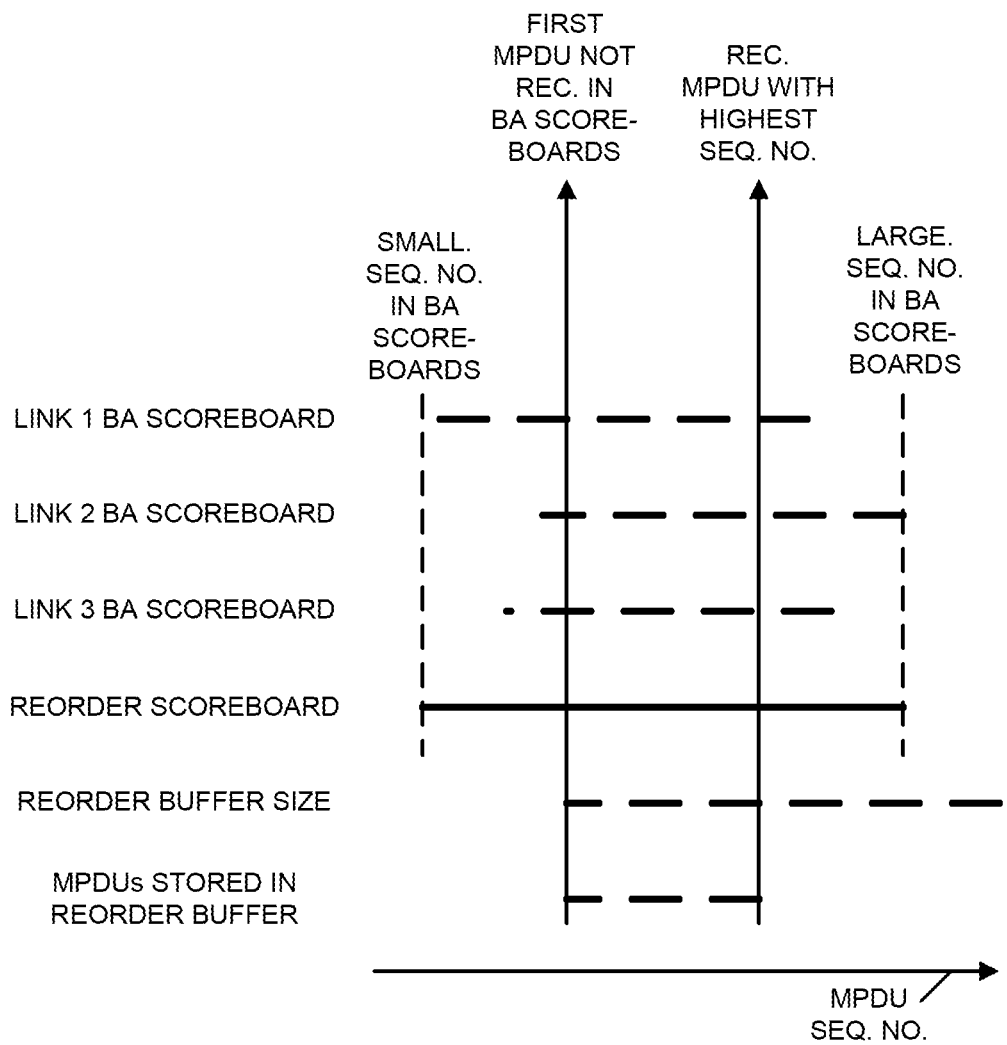
FIG. 9 is a drawing illustrating an example of block-acknowledgment scoreboard information in an electronic device of FIG. 1.

FIG. 8 presents a drawing illustrating an example of communication between an access point 112 and electronic device 110-1 via multiple links. In FIG. 8, the upper MAC/multi-link MAC in access point 112 may assign MPDU sequence numbers, transmission windows and/or set A-MPDUs to transmit. Moreover, links 1-3 may convey MPDUs. Furthermore, stations 4-6 in electronic device 110-1 may maintain block acknowledgment scoreboards, and multi-link STA upper MAC may include a reorder buffer and may perform MPDU decryption. Additionally, FIG. 9 presents a drawing illustrating an example of block-acknowledgment scoreboard information in an electronic device of FIG. 1, such as electronic device 110-1.

The block-acknowledgment scoreboard may be a link-specific record of the MPDUs received in a link by a recipient electronic device. The block-acknowledgment information may be transmitted in a block-acknowledgment frame. Moreover, a reorder buffer may buffer received MPDUs from the links and may organize the received MPDUs into sequence-number order. If MPDUs with continuous sequence numbers are received, then MPDUs may be forwarded to decryption and to an application. Furthermore, a reorder buffer may set the block-acknowledgment scoreboards to start from the smallest sequence number of an unreceived MPDU, which is communicated to the links. Additionally, a reorder scoreboard may be the combination of the link-specific block-acknowledgment scoreboards. Note that a transmission window may be a status at a transmitter of the block-acknowledgment windows, such as the combined status of the block-acknowledgment scoreboards in the links and the MPDUs in transmission in the links. For example, a transmission window may generate an A-MPDU and may control the MPDUs transmission and retransmissions. Buffered MPDUs may be the buffer in the transmitter of the MPDUs that are not yet transmitted.

Figure 10:
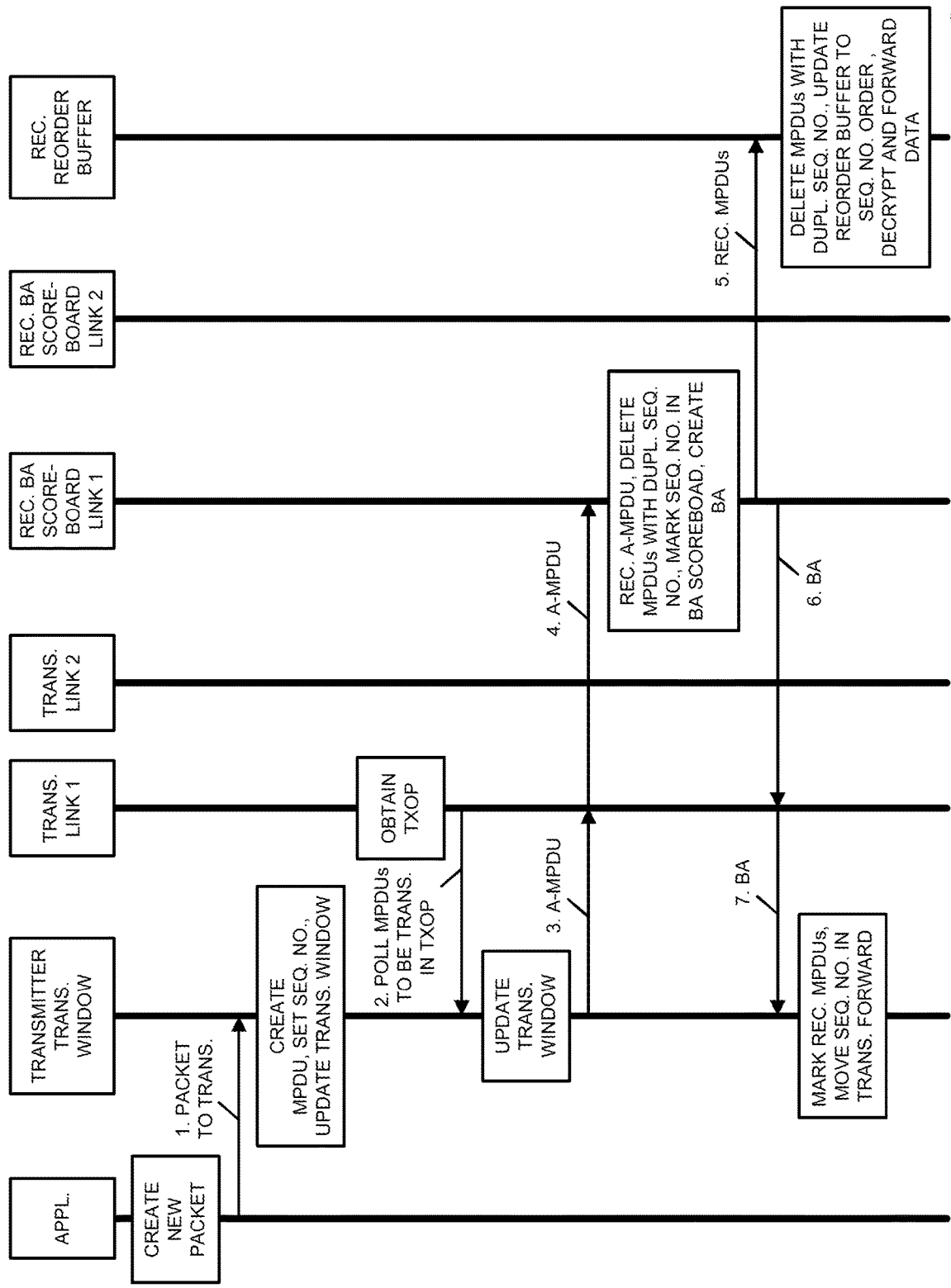
FIG. 10 is a drawing illustrating an example of communication among components in the electronic devices of FIG. 1.

FIG. 10 presents a drawing illustrating an example of communication among components in access point 112 and electronic device 110-1. Notably, the transmission window may control the transmitted data in the links. Moreover, the transmission window may aggregate MPDUs into an A-MPDU that is given to or provided for transmission to link-specific lower MAC. Furthermore, the transmission window may receive block acknowledgments from the links and may update its general block-acknowledgment scoreboard, which may contain the status of block acknowledgments in the links.

Furthermore, each of the links may have an independent block-acknowledgment scoreboard for each traffic identifier for which a block acknowledgment is established. Notably, a block-acknowledgment scoreboard position may be updated by the MDPUs and block acknowledgment requests transmitted in a link. The MPDUs and block-acknowledgment requests transmissions in other links may not change the block-acknowledgment scoreboard position. Note that the block acknowledgment may be (re)transmitted in the link in which the MPDUs were transmitted. For example, a block-acknowledgment request may request a block acknowledgment for frames transmitted in the same link. Additionally, a recipient electronic device may combine the status of the block-acknowledgment scoreboards in the reorder scoreboard. The reorder scoreboard may indicate if an MPDU is not received in any link.

Figure 11:
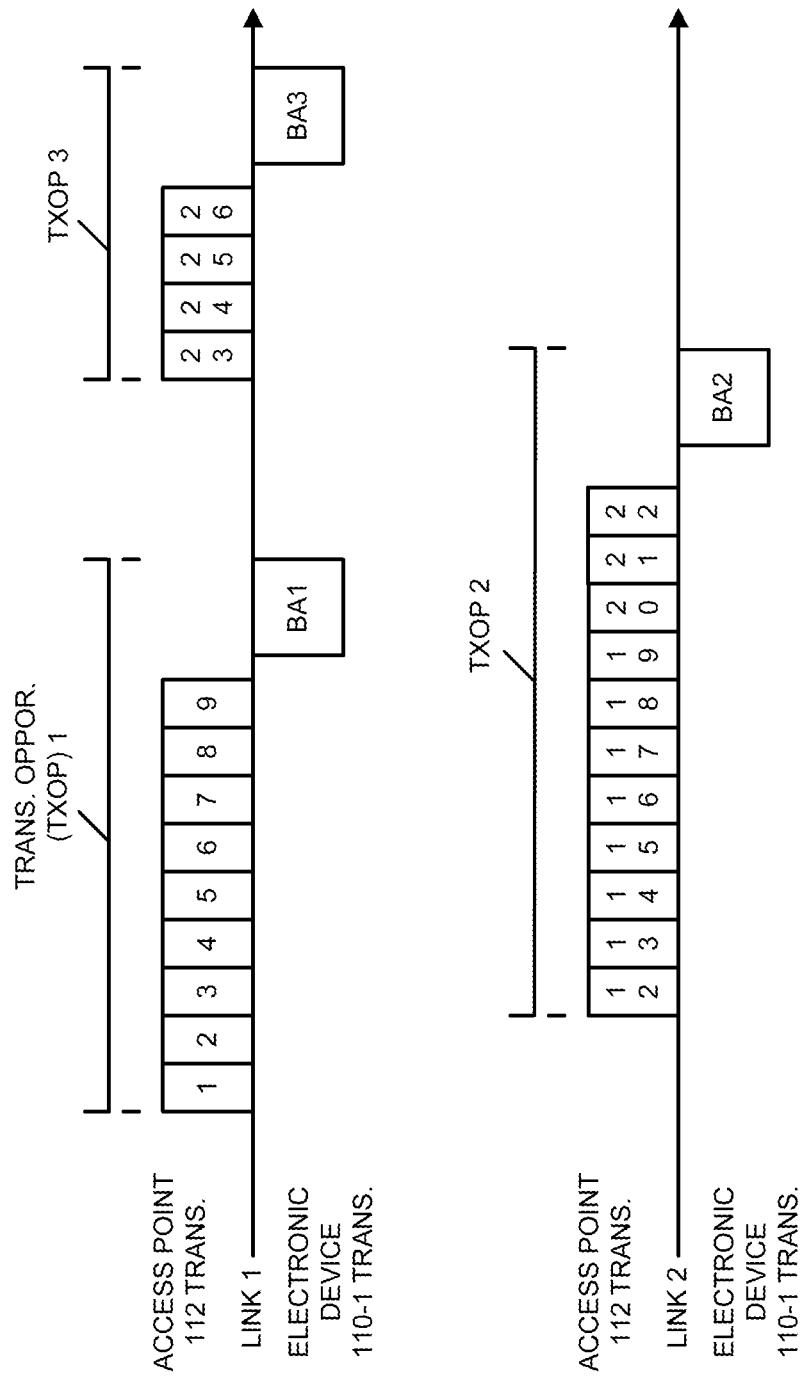
FIG. 11 is a drawing illustrating an example of communication between electronic devices of FIG. 1.

As shown in FIG. 11, which presents a drawing illustrating an example of communication between access point 112 and electronic device 110-1, block acknowledgments in each link may indicate a status of received MPDUs in the link and may optionally indicate successfully received MPDUs in other links. For example, the value '0' in a block-acknowledgment bitmap, which may indicate that the MPDU is not received, may be valid for the MPDUs transmitted in the link. Alternatively, the value '1' in the block-acknowledgment bitmap, which may indicate that the MPDU is received, may be optionally provided for the MPDUs transmitted in other links.

In some embodiments, a value of '1' in the block-acknowledgment bitmaps may indicate that a specific MPDU is received. Moreover, a value of '0' in a block-acknowledgment bitmap BA1 may indicate that MPDUs 1-9 have not been received, with no knowledge of the receive status of MPDUs 12-22. Furthermore, a value of '0' in a block-acknowledgment bitmap BA2 may indicate that MPDUs 12-22 have not been received, with no knowledge of the receive status of MPDUs 1-9. Additionally, a value of '0' in a block-acknowledgment bitmap BA3 may indicate that MPDUs 1-9 and MPDUs 23-26 have not been received, with no knowledge of the receive status of MPDUs 12-22.

Figure 12:
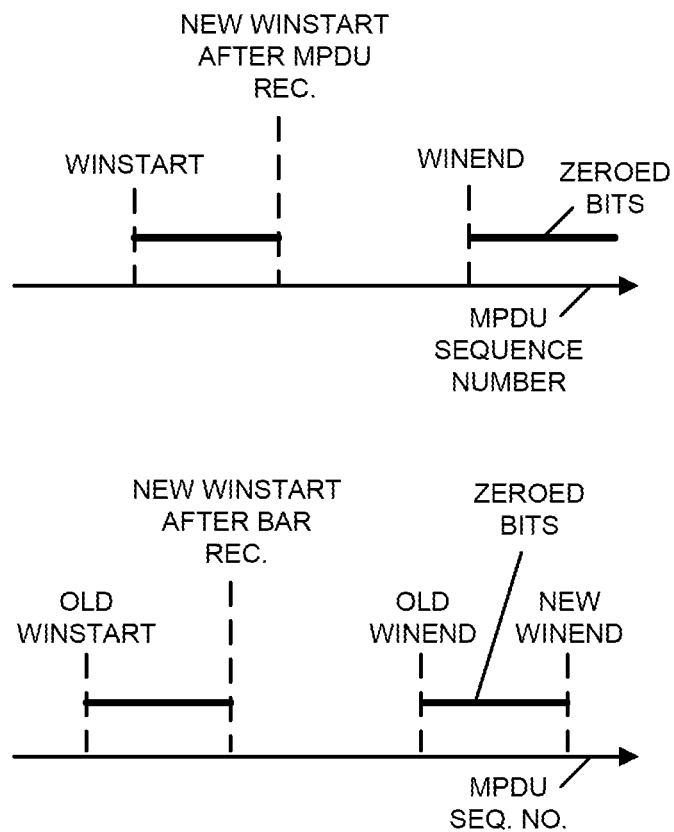
FIG. 12 is a drawing illustrating an example of block-acknowledgment scoreboard information in an electronic device of FIG. 1.

As shown in FIG. 12, which presents a drawing illustrating an example of block-acknowledgment scoreboard information in electronic device 110-1, a recipient electronic device may ignore MPDUs with sequence numbers less than a transmission window start value (WinStart). The block acknowledgment may not acknowledge these MPDUs. Moreover, the transmitter may control the MPDU sequence numbers that are within the block-acknowledgment window. Furthermore, the transmitter may change the window position in a recipient electronic device. In this way, a received MPDU that has a sequence number greater than the transmission window end value (WinEnd) may adjust the WinStart, so that the MPDU is within the block-acknowledgment window. Note that if the WinSize is 64, the WinEnd may equal the WinStart plus 63. Additionally, a received block-acknowledgment request frame that requests a block acknowledgment starting from a sequence number greater than the WinStart may set the WinStart to the sequence number indicated in the block-acknowledgment request. Note that new bits in the block-acknowledgment window may be zeroed when the WinStart is increased, e.g., a bit value of an unreceived MPDU in a block-acknowledgment window may be set to zero.

Figure 13:
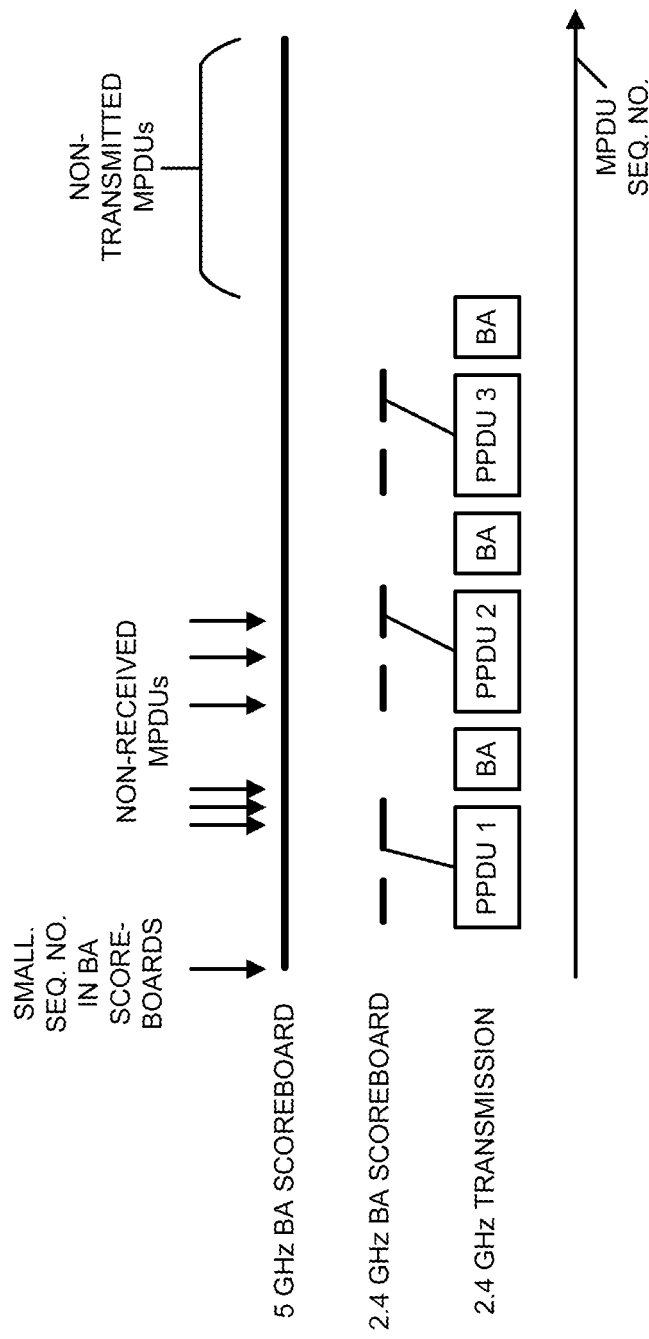
FIG. 13 is a drawing illustrating an example of block-acknowledgment scoreboard information in an electronic device of FIG. 1.

Additionally, as shown FIG. 13, which presents a drawing illustrating an example of block-acknowledgment scoreboard information in an electronic device 110-1, in some embodiments a 2.4 GHz radio and a 5 GHz radio may operate with different sized block-acknowledgment scoreboards and different sized reorder buffers. (Alternatively, in some embodiments the same buffer size is used for all of the links.) In some embodiments, there may have been a single link radio, and there may not have been a reorder scoreboard in the recipient electronic device. For example, the block-acknowledgment scoreboard size for the 2.4 GHz radio may be 64 MPDUs and for the 5 GHz radio may be 256 MPDUs. While the block-acknowledgment scoreboards in the links may have the same size, in some embodiments there may be different sized block-acknowledgment scoreboards. The disclosed block-acknowledgment structure in the communications techniques may be able to operate with different link-specific block-acknowledgment scoreboards. Similarly, block acknowledgments may use different block-acknowledgment modes, hybrid automatic repeat request (HARQ) and/or high-efficiency (HE) dynamic fragmentation modes. Notably, each link may be configured separately. Moreover, the recipient electronic device and transmitter capabilities, as well as link needs, may be considered, e.g., a 2.4 GHz radio may be HARQ capable.

In an example of transmitting data with a small block-acknowledgment scoreboard, a 5 GHz link may include the MPDUs to a single transmitted physical layer convergence procedure (PLCP) protocol data unit (PPDU). In a 2.4 GHz link, the PPDU size may be limited by the small block-acknowledgment scoreboard. Consequently, the MPDUs that fit within a block-acknowledgment scoreboard may be transmitted in a PPDU. Therefore, the number of PPDUs and block acknowledgments may be increased in the 2.4 GHz link.

Figure 14:
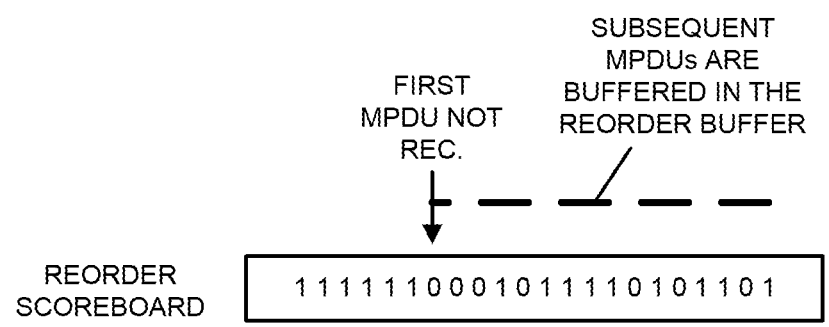
FIG. 14 is a drawing illustrating an example of a reorder scoreboard in an electronic device of FIG. 1.

Referring back to FIG. 9, which presents a drawing illustrating an example of block-acknowledgment scoreboard information in electronic device 110-1, a link-specific block-acknowledgment scoreboard may receive MPDUs that set the block-acknowledgment scoreboards to different sequence number spaces. Moreover, as shown in FIG. 14, which presents a drawing illustrating a reorder scoreboard in electronic device 110-1, the reorder scoreboard may combine block-acknowledgment scoreboards and may maintain status between the smallest and the largest block-acknowledgment scoreboards. Furthermore, the reorder scoreboard may maintain a scoreboard with a larger size than the block-acknowledgment scoreboard. If an MPDU is not received, the reordering buffer may store the MPDUs with higher sequence numbers. Consequently, the reorder buffer may contain a subset of the transmitted MPDUs information. Additionally, the MPDUs in the reorder buffer may be released when the first unreceived MPDU is received, or when the unreceived MPDU is no longer within the reorder scoreboard. Note that the reorder buffer may release MPDUs to decryption and from there downlink data may be provided to an application and uplink data to a network (such as the Internet).

Figure 15:
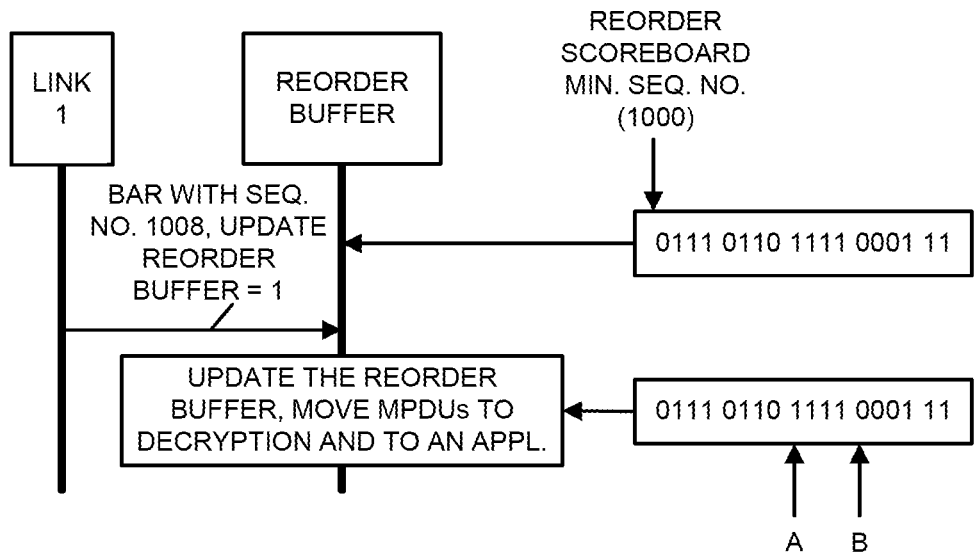
FIG. 15 is a drawing illustrating an example of a reorder scoreboard and a reorder buffer in an electronic device of FIG. 1.
Figure 15:
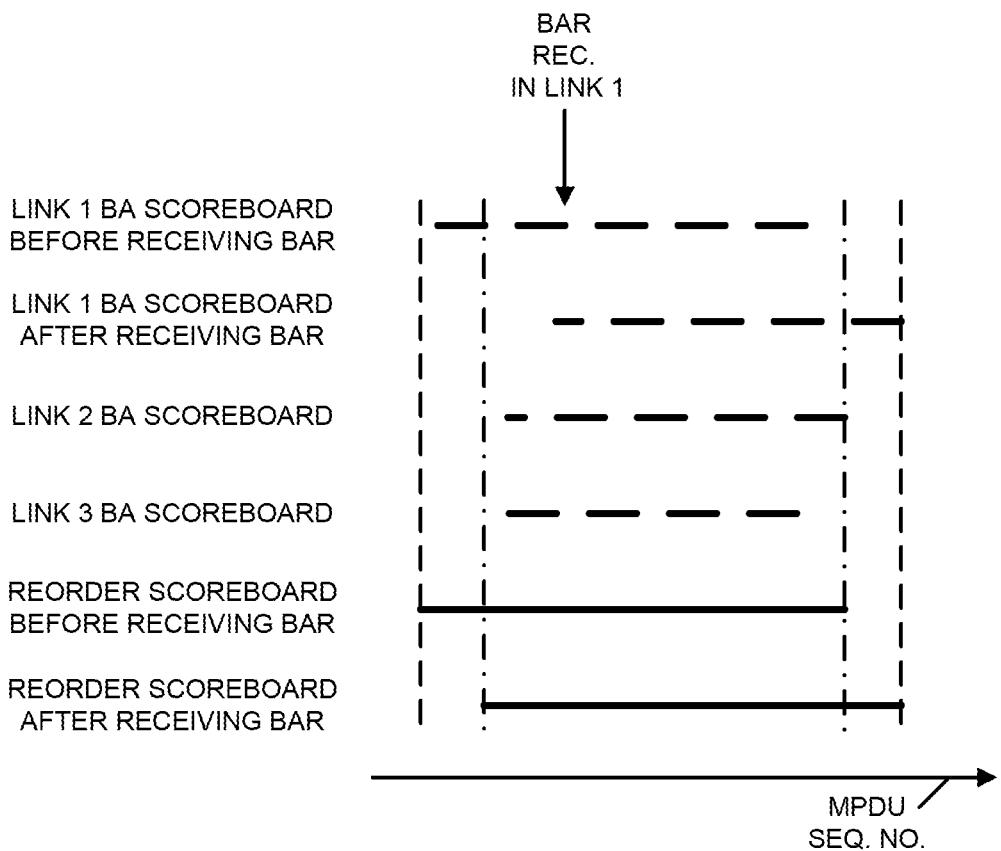

Furthermore, as shown in FIG. 15, which presents a drawing illustrating an example of a reorder scoreboard and a reorder buffer in electronic device 110-1, the reorder scoreboard may be moved forward by receiving an MPDU with a sequence number greater than a minimum sequence number of an unreceived MPDU plus a reorder buffer size. Note that the reorder buffer may be moved forward to store the received MPDU. In some embodiments, the possible correctly received MPDUs that no longer fit within the reorder buffer may be released to an application. Alternatively or additionally, the reorder scoreboard may be moved forward by receiving a block-acknowledgment request frame requesting a block acknowledgment from a sequence number.

When the MPDU with the sequence number greater than the minimum sequence number of the unreceived MPDU plus the reorder buffer size is received, the block-acknowledgment scoreboard in the link where the block-acknowledgment request is received and the reorder scoreboard start are set to the sequence number indicated in the block-acknowledgment request. Note that MPDUs with sequence numbers less than the sequence number in the block-acknowledgment request may be released to an application. Therefore, the reorder scoreboard may ignore the sequence numbers that are less than the sequence number in the block-acknowledgment request.

For example, as shown in FIG. 15, at shown at position A, the BAR moves the reorder scoreboard start to 1008. Moreover, as shown at position B, the MPDUs 1009-1012 are received correctly, so the reorder buffer start is moved to 1013.

Alternatively, when the block-acknowledgment request frame requesting the block acknowledgment from the sequence number is received, the block-acknowledgment request frame may signal whether the block-acknowledgment scoreboard may start from the sequence number indicated in the block-acknowledgment request. In this embodiment, the reorder scoreboard may be updated if the updated block-acknowledgment scoreboard no longer contains the smallest sequence-number values, or if the block-acknowledgment scoreboard contains the largest sequence number. Note that, if the transmitter does not know the smallest unreceived frame sequence number in transmission in the links, the transmitter may update the block-acknowledgment scoreboard. Then, the reorder buffer may release MPDUs when the block-acknowledgment windows of the links have passed the sequence numbers.

Figure 16:
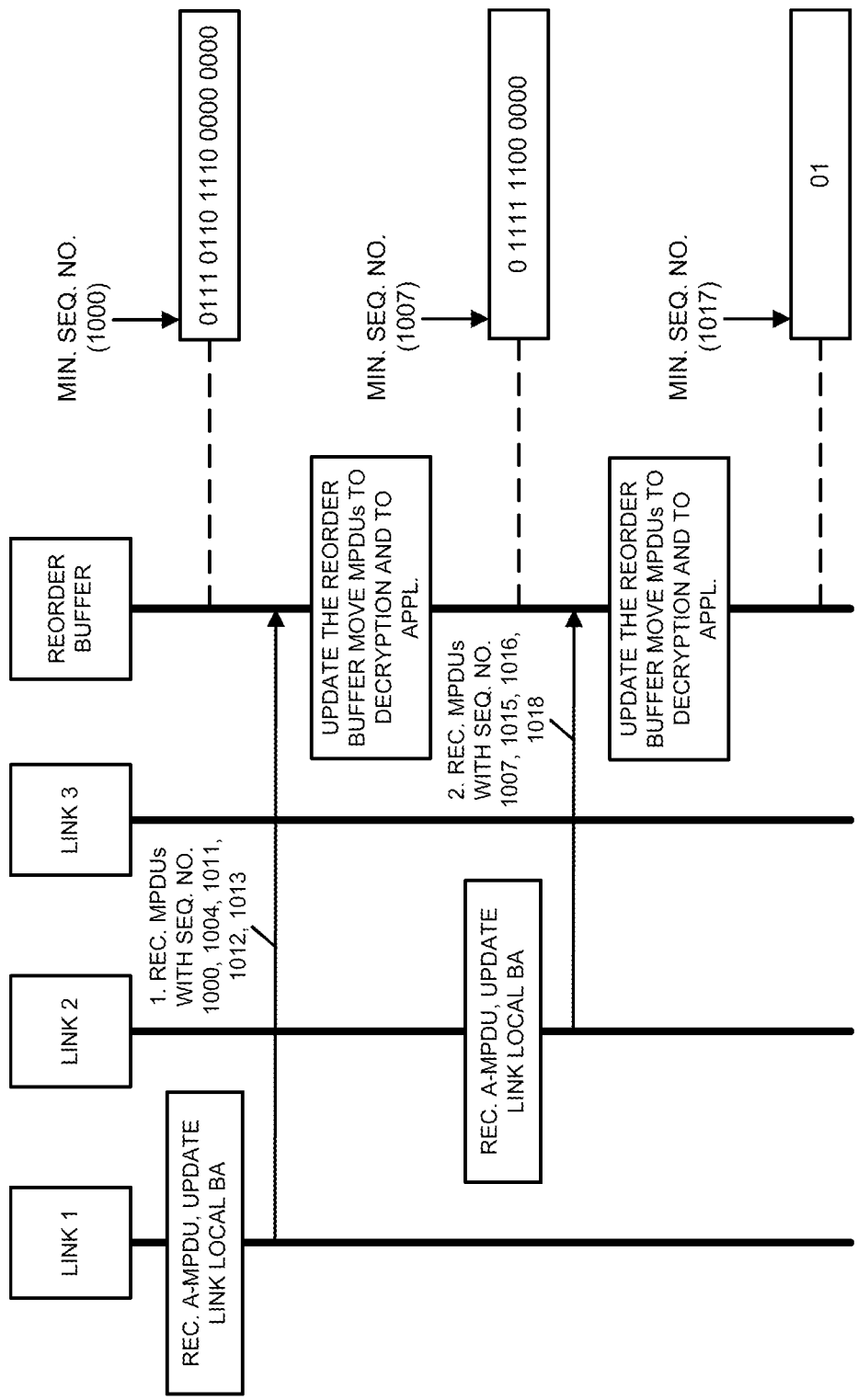
FIG. 16 is a drawing illustrating an example of communication among components in an electronic device of FIG. 1.

FIG. 16 presents a drawing illustrating an example of communication among components in electronic device 110-1. Notably, FIG. 16 provides an example of reorder-buffer maintenance during data transmission.

Additionally, the reorder buffer may have at least the size of the largest block-acknowledgment scoreboard. This may ensure that the links are able to retransmit the MPDUs to the access point. Consequently, the reorder buffer size may not be signaled. Alternatively, the implementation may not limit the reorder buffer size. Instead, if needed, the MPDUs in the reorder scoreboard may be stored to reorder buffer. In some embodiments, a larger reorder buffer size may be used. Note that a larger reorder buffer may enable some additional operating time for the recipient electronic device. This approach may also allow the operating time for the recipient electronic device if there are delays associated with the MPDUs delivery from the link to the reorder buffer or the processing. Moreover, the reorder buffer operating time requirement may be much looser than sending a block acknowledgment after a short interframe space (e.g., 16 μs) following data transmission.

Figure 17:
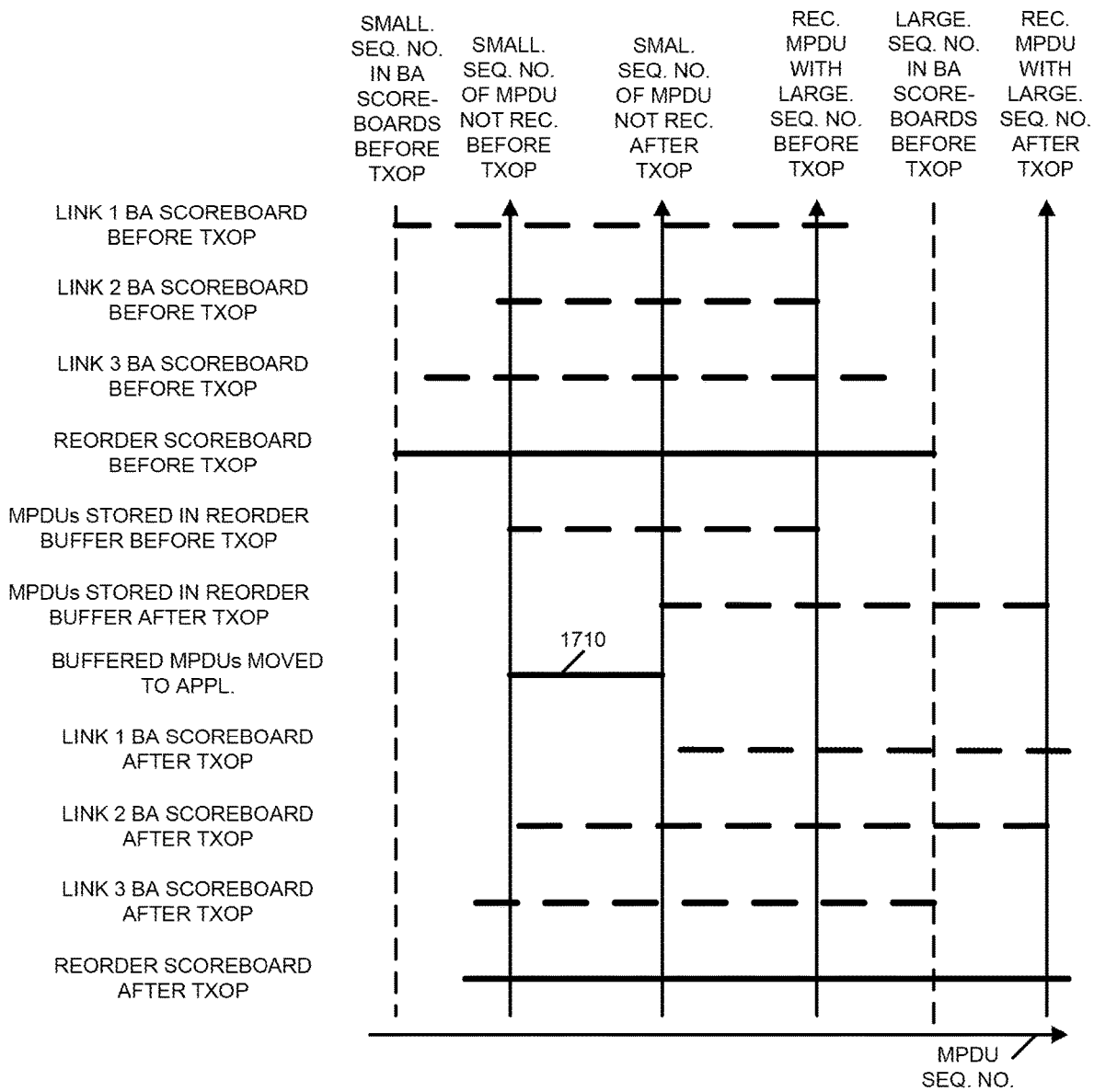
FIG. 17 is a drawing illustrating an example of block-acknowledgment scoreboard information in an electronic device of FIG. 1.

Moreover, as shown in FIG. 17, which presents a drawing illustrating an example of block-acknowledgment scoreboard information in electronic device 110-1, if the reorder buffer size is limited and the received MPDU does not fit within the reorder buffer (e.g., a sequence number is greater than the MPDU with the smallest sequence number plus a reorder buffer size), then the reorder buffer may be moved to fit the received MPDU with highest sequence number. Furthermore, the MPDUs that are removed from reorder buffer may be forwarded to decryption and to the application. The motivation may be to avoid signaling from the reorder buffer to the block-acknowledgment scoreboards. In some embodiments, the transmitter may control that the block acknowledgments get relevant traffic (e.g., a transmitter may synchronize the links in the transmission window). Additionally, the smallest sequence number of the reorder buffer may not be updated to the links. The transmitter may need to receive a block acknowledgment and to determine the smallest sequence number of an MPDU in the reorder buffer. Note that a link-specific block acknowledgment may acknowledge MPDUs that cannot be included to or in the reorder buffer. Additional operation of the synchronized block acknowledgment is described further below. In FIG. 17, region 1710 indicates the MPDUs that are released to an application.

Figure 18:
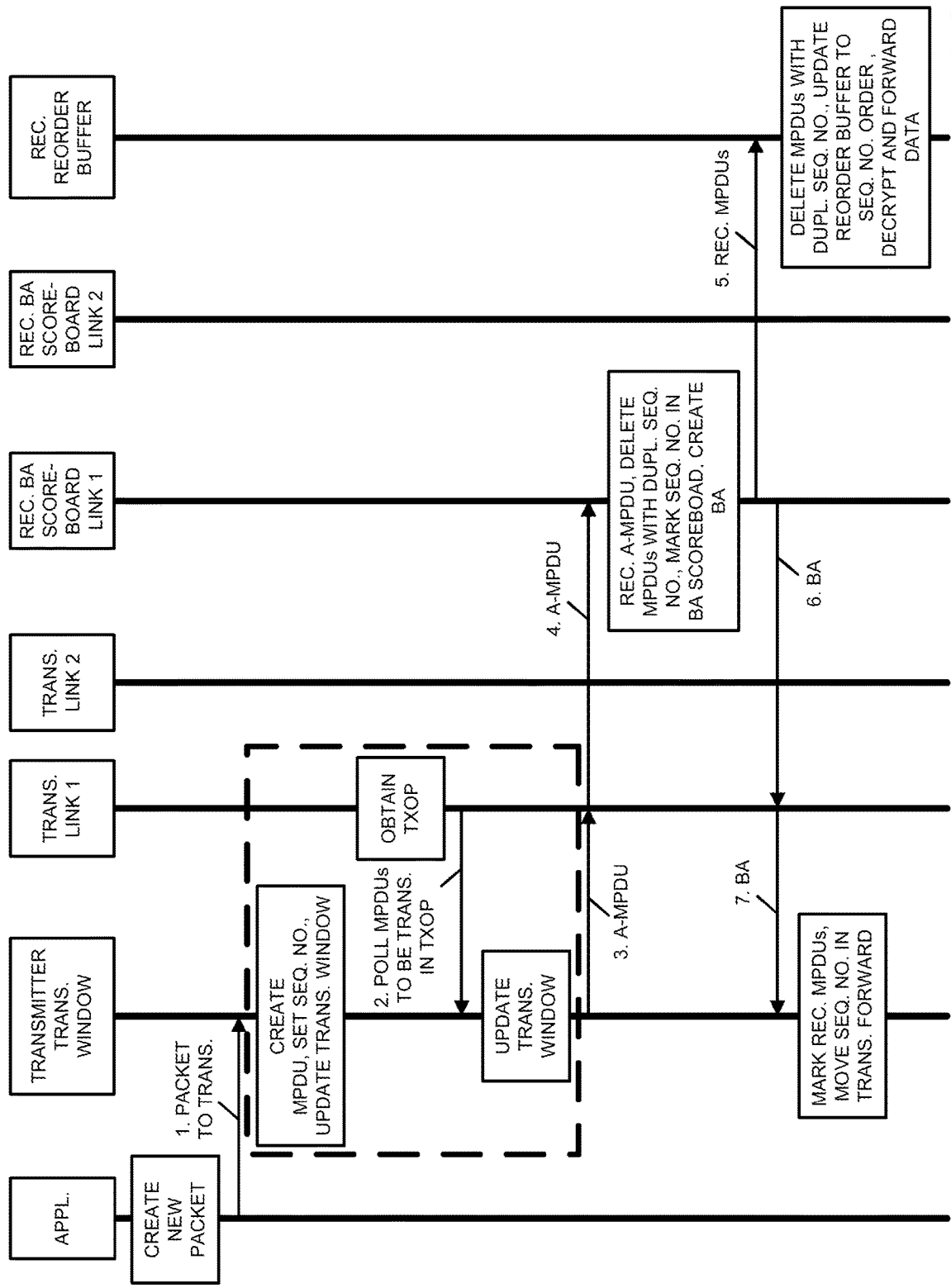
FIG. 18 is a drawing illustrating an example of communication among components in the electronic devices of FIG. 1.
Figure 19:
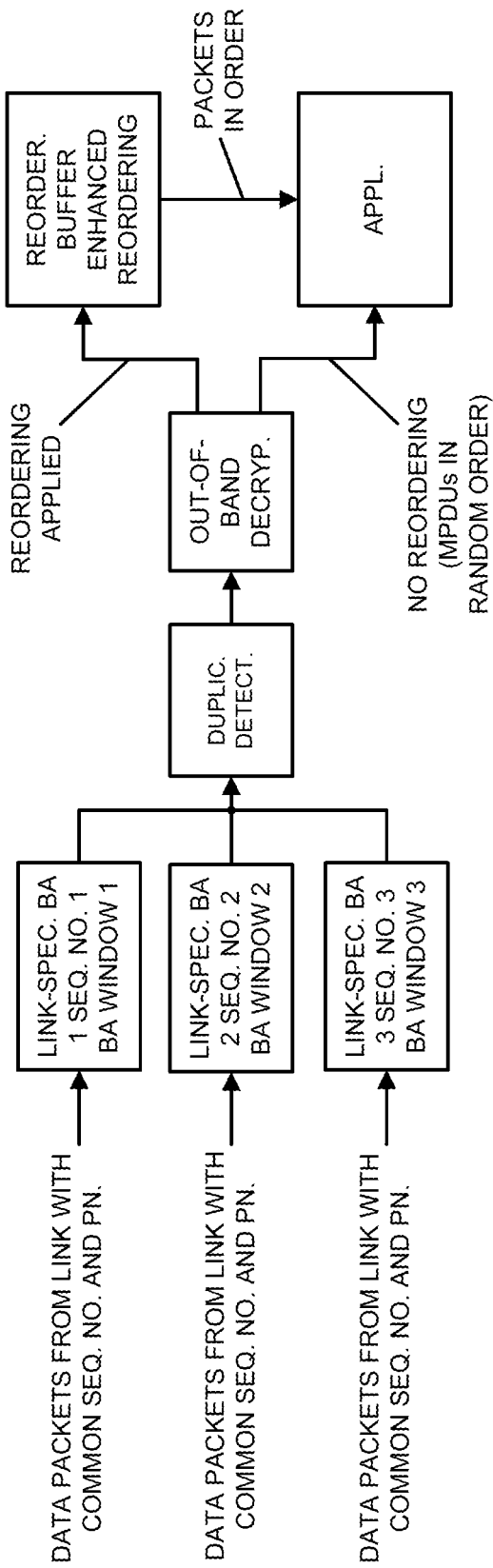
FIG. 19 is a drawing illustrating an example of communication among components in an electronic device of FIG. 1.

Furthermore, as shown in FIG. 18, which presents a drawing illustrating an example of communication among components in access point 112 and electronic device 110-1, the links may share the same reorder buffer, so a transmitter may transmit MPDUs that fit in the reorder buffer. The reorder buffer size may equal the size of the largest block-acknowledgment scoreboard. Moreover, the transmitter may transmit an MPDU if the following conditions are met: the MPDU sequence is greater or equal to the smallest unreceived or unacknowledged MPDU sequence number plus the reorder buffer size; the transmitted MPDU sequence number is less than the smallest unreceived or unacknowledged MPDU sequence number plus the block-acknowledgment scoreboard size; and/or the MPDU is not currently in transmission in any of the links Additionally, as shown in FIG. 19 presents a drawing illustrating an example of communication among components in electronic device 110-1, in some embodiments, received packets (or frames) may be decrypted even when the packets are not in the sequence-number order. For example, a recipient electronic device may decrypt a packet as long as a packet number of a frame with a packet sequence number minus one is less than a packet number of a frame with the packet sequence number. Notably, the rule may be that the packet number values and sequence number values may be increasing in the received MPDUs. Thus, if the frames are reordered according to sequence number, the packets may also be reordered. A check can be performed to confirm that the packet numbers are increasing (even if the increment is larger than one). When the decryption does not require MPDUs organized in the sequence-number order, then the reorder buffering may not be needed for the received MPDUs. For example, real-time applications (such as VoIP, streaming video and/or gaming data) may be passed immediately to the application.

In some embodiments, if a recipient electronic device does not perform reordering for a traffic identifier, then the reorder buffer size may not limit the number of packets that links may send or convey. Moreover, each link may have a link-specific block acknowledgment. Consequently, the link-specific block acknowledgments may limit the amount of traffic. Furthermore, duplicate detection in different links may be implemented with, e.g., a 4096-bit long bitmap. Additionally, the recipient electronic devices may signal that they are not using reordering buffering, otherwise the transmitter may reduce transmissions to fit within the reorder buffer.

Note that block-acknowledgment windows may operate at different positions. For example, link 1 may retransmit the MPDUs that have sequence numbers that are less than a link block-acknowledgment window. In this operation, the block-acknowledgment windows may limit throughput. Notably, there may not be a traffic-identifier specific throughput limit for the links.

Moreover, without traffic-identifier reordering, a block-acknowledgment scoreboard may be a link-specific record for a recipient electronic device of the MPDUs received in a link. (Thus, there may not be a central entity or a common block-acknowledgment window.) The block-acknowledgment scoreboard information may be transmitted in block-acknowledgment frame. Furthermore, a block-acknowledgment window may be link-specific bookkeeping for a transmitter of the block-acknowledgment scoreboard obtained for the received block acknowledgments and MPDUs in transmission in the link. Note that a transmitter may create A-MPDUs to the link and may control the transmitted MPDUs and A-MPDUs to link. Additionally, the reorder scoreboard may include the combination of the link-specific block-acknowledgment scoreboards for the recipient electronic device. The reorder window may include the status of the block-acknowledgment windows in the transmitter (e.g., the combined status of the block-acknowledgment scoreboards in the links and MPDUs in transmission in the links. Note that buffered MPDUs may be the buffer in the transmitter of the MPDUs that have not yet been transmitted.

Figure 20:
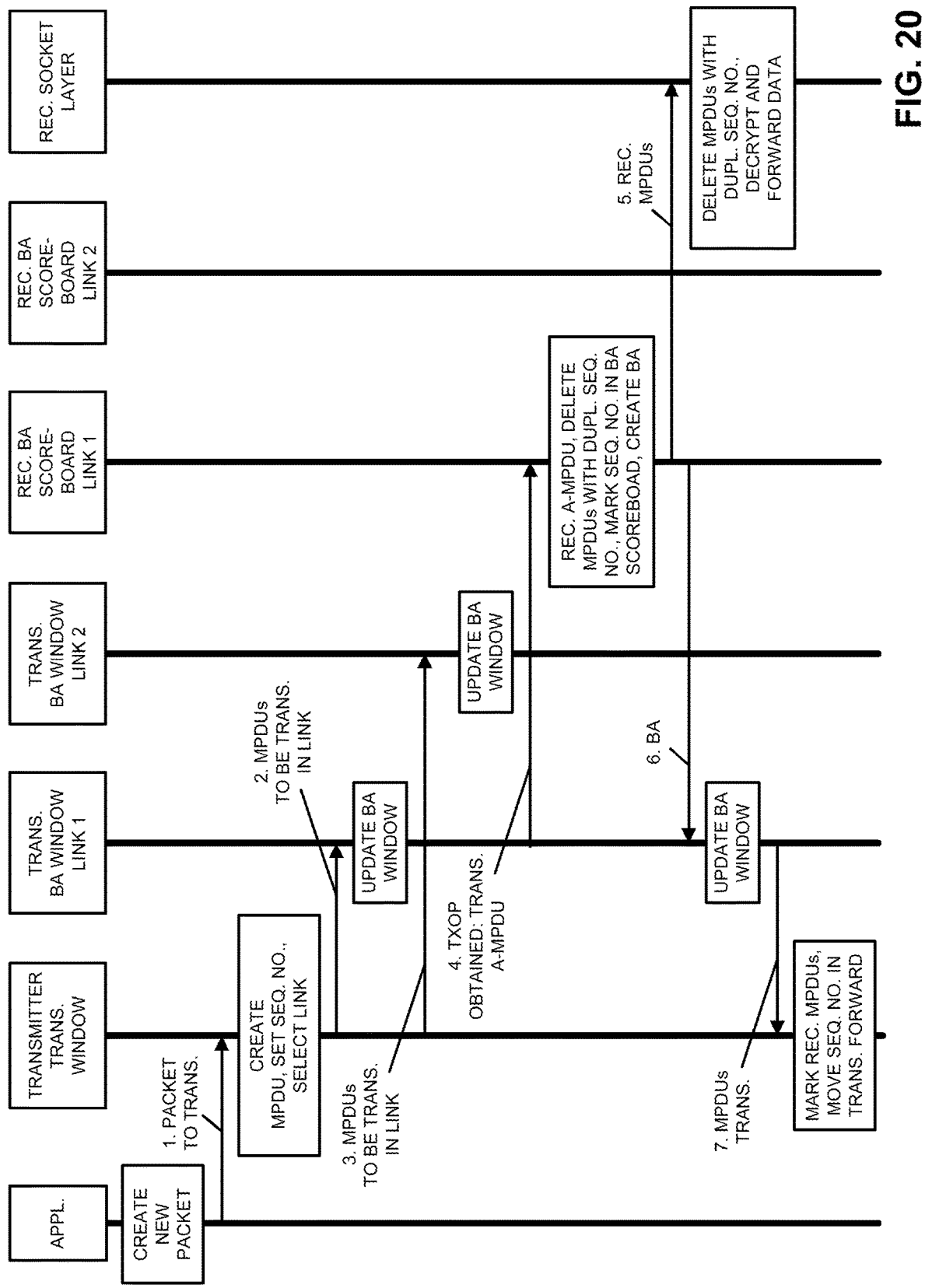
FIG. 20 is a drawing illustrating an example of communication among components in the electronic devices of FIG. 1.

Furthermore, as shown in FIG. 20, which presents a drawing illustrating an example of communication among components in access point 112 and electronic device 110-1, the transmission window may control which link gets the MPDUs to transmission. (Thus, there may be multiple transmission windows.) Note that the link may operate with independent block-acknowledgment windows. Moreover, the transmitted MPDUs in a PPDU may be acknowledged by a block acknowledgment. For example, sequence numbers may fit within the link-specific block-acknowledgment window. There may be small coordination of sequence numbers in or during transmission. Alternatively, the transmitter may use a transmission window and may select the MPDUs in transmission as shown in FIG. 10. The transmitter may ignore the reorder buffer size.

Figure 21:
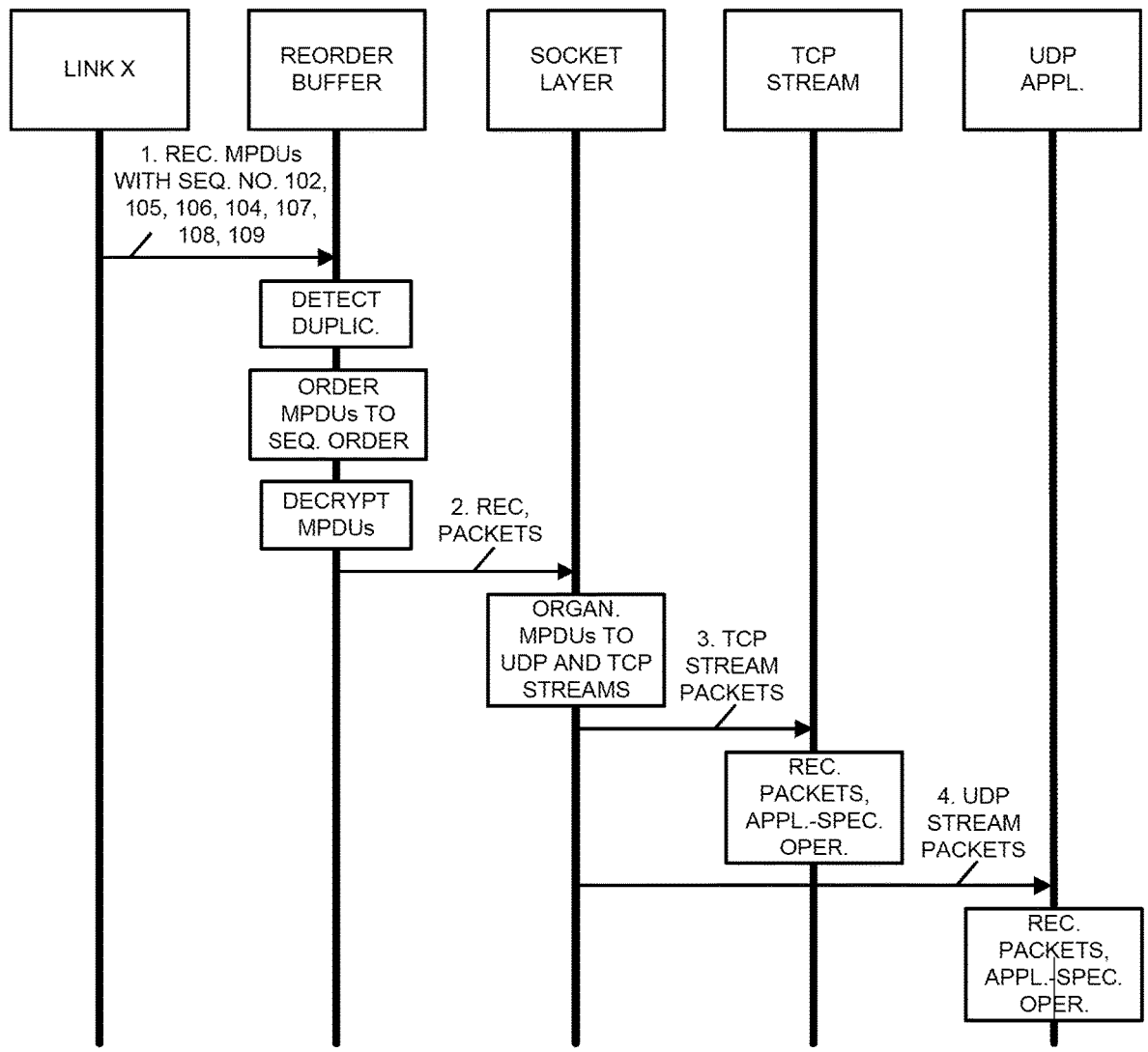
FIG. 21 is a drawing illustrating an example of communication among components in an electronic device of FIG. 1.
Figure 22:
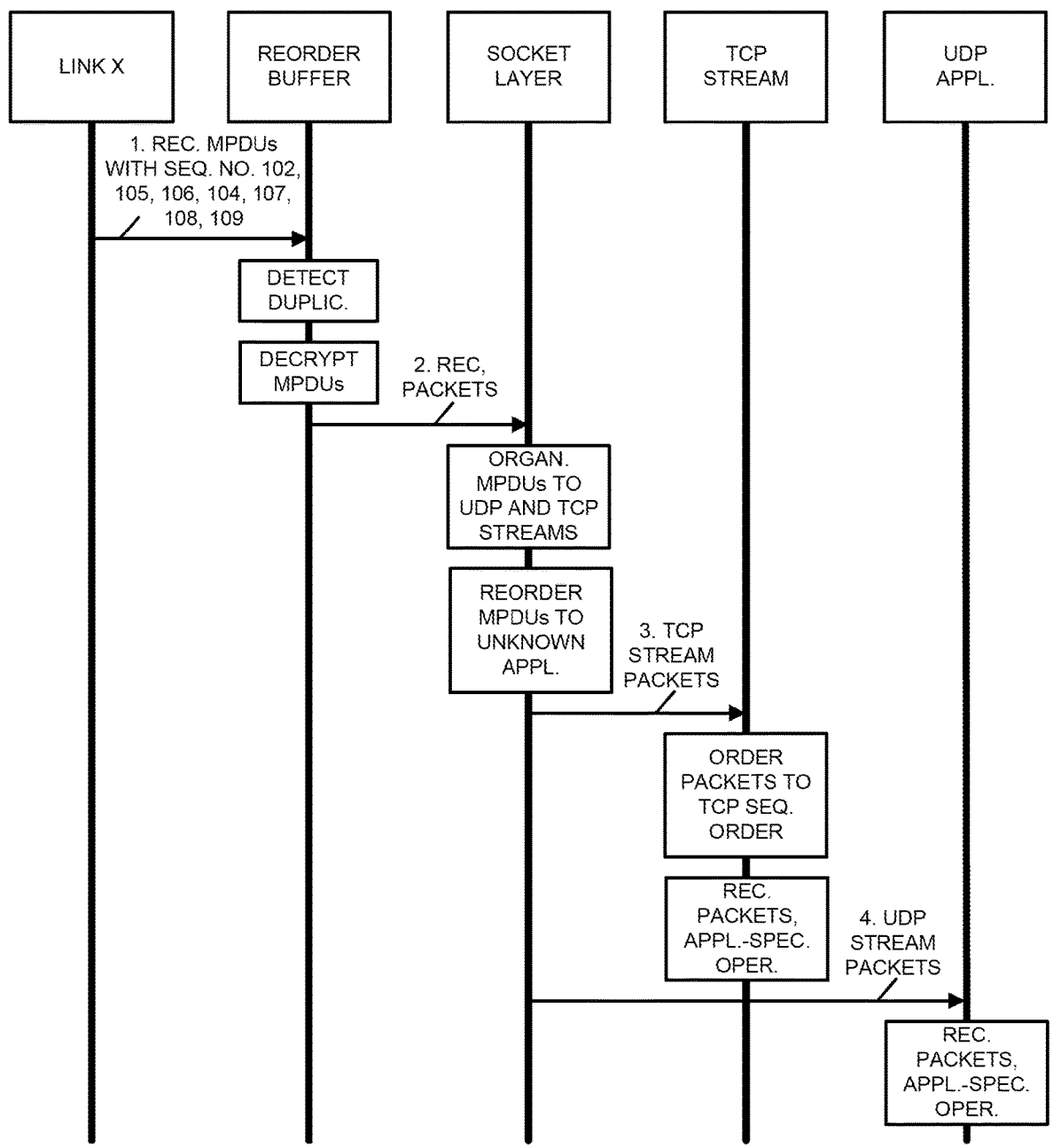
FIG. 22 is a drawing illustrating an example of communication among components in an electronic device of FIG. 1.

Additionally, as shown in FIG. 21, which presents a drawing illustrating an example of communication among components in electronic device 110-1, with reordering, the reorder buffer may order the MPDUs to be in the sequence-number order. When packets are in order, they may be decrypted and moved to the socket layer. Alternatively, as shown in FIG. 22, which presents a drawing illustrating an example of communication among components in electronic device 110-1, when no reordering buffering is used, the packets may be decrypted out-of-the order. After decryption, the packet payload may be forwarded to the socket layer.

Figure 23:
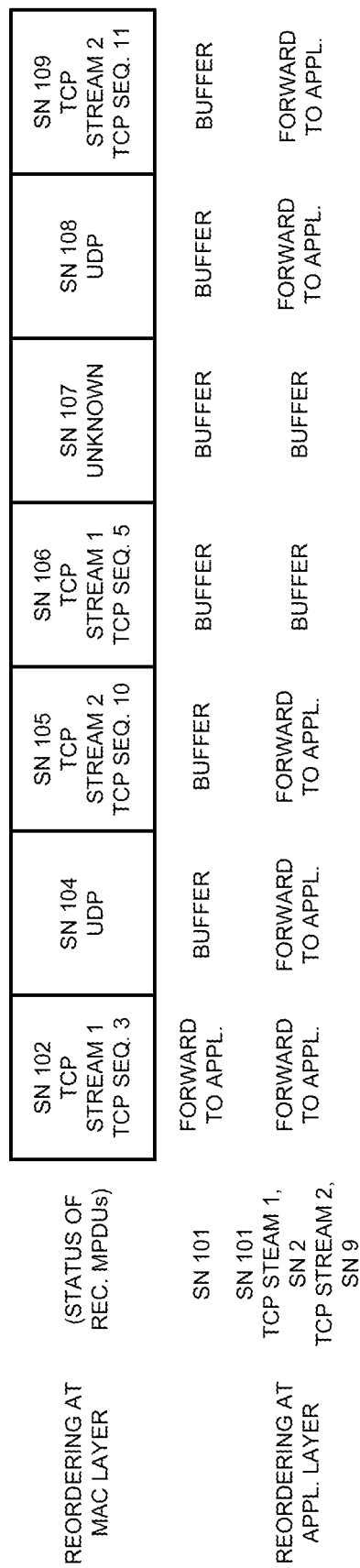
FIG. 23 is a drawing illustrating an example of reordering of media access control (MAC) protocol data units (MPDUs) in an electronic device of FIG. 1.

In some embodiments, as shown in FIG. 23, which presents a drawing illustrating an example of reordering of MPDUs in electronic device 110-1, the socket layer between the MAC layer and the application layer may perform the reorder buffering for the received packets. Notably, the MAC layer may provide the traffic identifier and MPDU sequence-number information to the socket layer. Then, the socket layer may organize the received packets into TCP streams, user datagram protocol (UDP) applications and/or unknown packets. Moreover, the socket layer may perform reorder buffering to TCP and unknown applications. This approach may provide the benefits of: fewer MPDUs are stored than in legacy MPDU-level reorder buffering; on average, the transmission delays may be reduced; UDP applications may be faster; and/or TCP streams may proceed independently. Note that MPDUs may be decrypted as soon as a packet arrives. This may reduce the number of MPDUs in a decryption queue. For example, a reorder buffer may include 1024 MPDUs, and decryption of these MPDUS may add a delay. In some embodiments, when a sequence number is missing, subsequent MPDUs may be buffered in the MAC layer. Alternatively or additionally, unknown packet numbers may be buffered.

Moreover, the socket layer between the MAC layer and one or more applications may perform the reorder buffering for the received packets. Notably, the MAC layer may provide the traffic identifier and MPDU sequence-number information to the socket layer. Then, the socket layer may organize the received packets into TCP streams, UDP applications and/or unknown/unclassified packets. Furthermore, the socket layer may perform reorder buffering into TCP and/or unknown applications. If the socket layer has a limited size buffer for application data ordering, the transmission window may calculate the number packets that a recipient electronic device needs to buffer and may control the total amount of transmitted data over the links.

Figures 24, 25:
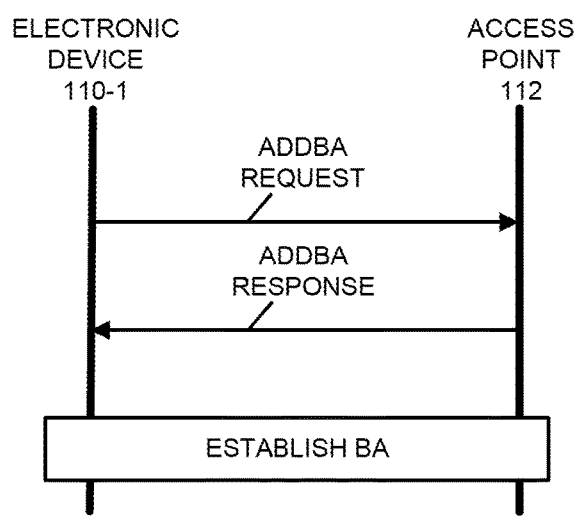
FIG. 24 is a drawing illustrating an example of communication between electronic devices of FIG. 1.
FIG. 25 is a drawing illustrating an example of fields in a frame communicated between the electronic devices of FIG. 1.

Furthermore, as shown in FIG. 24, which presents a drawing illustrating an example of communication between access point 112 and electronic device 110-1, a recipient electronic device may setup a link-specific block-acknowledgment mode. In some embodiments, block acknowledgments for the links may be set up at the same time using a block-acknowledgment request and a block-acknowledgment response. Notably, in order to establish block acknowledgment, a recipient electronic device (such as electronic device 110-1 or, alternatively, access point 112) may provide an add block-acknowledgment (ADDBA) request frame to an electronic device (such as access point 112 or, alternatively, electronic device 110-1), which may respond with an ADDBA response frame. For example, a value of '1' in a link-specific block-acknowledgment may indicates that an ADDBA request frame provides: a block-acknowledgment parameter set, a block-acknowledgment timeout value and/ or an add block-acknowledgment extension value separately for each link. The values may be provided in a link-identifier specific order, starting from the lowest link-identifier value. An add block-acknowledgment response may indicate whether the recipient electronic device accepts the link-specific block-acknowledgment values. Alternatively, a value of '0' may indicate that the same block-acknowledgment parameters are used for the links. FIG. 25 presents a drawing illustrating an example of fields in a ADDBA request frame communicated between access point 112 and electronic device 110-1. Notably, bit zero may specify no fragmentation, bits 1 and 2 may specify high-efficiency fragmentation, bit 3 may specify link-specific block acknowledgment parameters, bits 4 and 5 may specify MPDU reordering, and bits 6 and 7 may be reserved. Note that the ADDBA response frame action field format order may include the following information: a category, a block acknowledgment action, a dialog token, a status code, a block acknowledgment parameter set, a block acknowledgment timeout value, an optional GCR group address element, option multi-band, optional traffic classification (TCLAS), and/or an optional ADDBA extension.

Additionally, the MPDU reordering may indicate the mode of the MPDU reordering. For example, a value of '0' may indicate that MPDU reordering is performed in the MAC Layer. Notably, a reorder buffer may reorder the MPDUs into sequence-number order. Alternatively, a value of '1' may indicate that MPDU reordering is not performed for the MPDUs. Moreover, a value of '2' may indicate that reordering is performed in the socket layer (as discussed previously). Note that a value of '3' may be reserved.

In some embodiments, a single multi-link physical access point may be the default IEEE 802.11be configuration. For example, an access point may have a single chip or integrated circuit for its radios. In these embodiments, the block-acknowledgment scoreboards, and the transmission window and the reorder buffer may be shared in the links. Alternatively, a multi-link access point may have multi-chips or the access point may consist of multiple physical access points. Note that the communication between the access points/chips may be slow. This may prevent the access point from transmit traffic from a single traffic identifier over multiple links.

Moreover, the reorder buffer handling enhancements may mitigate the problems with multi-link access points and may allow transmissions on multiple links. For example, the access point may have transmit traffic for a traffic identifier in links that have the same transmission window regardless of the reorder buffer handling in the recipient electronic device. Note that, if the recipient electronic device does reorder the traffic belonging to the traffic identifier in the MAC level, the access point may transmit data from a traffic identifier in the links even if the access point cannot coordinate the transmission window for the links. Alternatively or additionally, if the access point does not reorder traffic-identifier specific traffic in the MAC layer, the recipient electronic device may transmit traffic-identifier specific traffic to the links. This capability may provide flexibility in link selection, smaller transmission delays and/or higher throughputs.

Furthermore, a home network may include three to five access points. Block acknowledgments for these access points may be setup at the same time. When a multi-recipient-electronic-device access point can maintain a link and block acknowledgments with the access point, basic service set (BSS) transitions between the access points may not be needed. This capability may make recipient-electronic-device performance seamless within the network coverage. Moreover, when block acknowledgment is already setup with multiple access points, the recipient electronic device may immediately start sending data.

Additionally, the recipient electronic device may select the links it is operating. For example, the recipient electronic device may operate on links that have joint transmission window and reorder buffering, if its traffic identifier requires MAC level reordering. Alternatively, if reorder buffering can be performed in the socket level, the recipient electronic device/access point may transmit to one or more of the links of the multi-access point/multi-recipient electronic device.

However, of the traffic identifier does not require reordering, the recipient electronic device/access point may transmit to one or more of the links of the multi-access point/multi-recipient electronic device.

In some embodiments, the links operating in a physical access point may be signaled to the recipient electronic device. This capability may be implemented by a reduced neighbor report that contains one or more co-located bits for specific access points. Typically, links operated by the access point may have similar link performance.

Note that the links with synchronized receive and/or synchronized transmit may be signaled to the recipient electronic device. Moreover, the recipient electronic device may select to be available on links that are synchronized. The traffic-identifier specific traffic that requires reordering at the MAC level may be transmitted using these links.

In some embodiments, transmission occurs on links with joint reordering and a common transmission window.

In summary, the embodiments of the communication techniques provide link-specific block-acknowledgement operation. Notably, in the communication techniques each link may maintain its own block-acknowledgement scoreboard. Moreover, the block acknowledgements may have different parameters and block-acknowledgement scoreboard sizes for each link. Furthermore, the reorder buffer may limit the amount of traffic that is transmitted to a multi-link recipient electronic device. Traffic in transmission in the links may fit into the reorder buffer. Additionally, reorder buffer alternatives are described. When reordering of the received MDPUs is not required in the MAC level, the recipient electronic device may transmit more traffic. For example, a link-specific block-acknowledgement may limit the amount of traffic in transmission. Note that alternative architectures for some use cases are described. These embodiments may help operation in a BSS, especially residential BSSs.

Note that in a legacy single link transmission, MPDUs may be transmitted in an A-MPDU in any order. Moreover, multiple MPDUs may be acknowledged with a single block acknowledgement. The received MPDUs may be reordered into MPDU sequence number. Furthermore, the MPDUs may be forwarded or provided to an application or to a network (such as the Internet). Furthermore, if some MPDUs are not received, the transmitter may retransmit the MPDUs as long as they fit within the block-acknowledgement window, e.g., 64 or 256 MPDUs. Additionally, the reorder buffer may have the same size and similar content as the block-acknowledgement window. In some embodiments, the block-acknowledgement window may proceed if the MPDUs within the window are received or an MDPU transmission has failed (e.g., a lifetime has expired, a maximum number of retransmissions is exceeded, etc.).

In some embodiments of the communication techniques, a block acknowledgment is provided with an out-of-order packet (or frame). An existing IEEE 802.11 block acknowledgment typically requires a recipient electronic device to hold frames in a reorder buffer until gaps in the sequence number slot are filled, and to reorder the held frames and to pass them in sequence to an upper layer. However, this approach has several drawbacks, including a higher memory requirement. Notably, the recipient electronic device may have to be capable of holding up frames with a size up to the window size. Moreover, there may be a higher latency. Consequently, an application may have to wait until any missing frames are received, a retransmission timeout, or until a lifespan of a frame expires (which may impact the user experience, especially for latency sensitive application, e.g., a video application). Furthermore, reordering frames and passing them to an upper layer in sequence may align with applications that runs on TCP/Internet Protocol (IP), because TCP may only pass packets in-order (IO) to an application layer. For applications that are not running at TCP/IP (e.g., video PAL that is provided directly to a link layer or video over user datagram protocol (UDP)/IP to the link layer), an existing block-acknowledgment technique may not have the flexibility to deliver out-of-order packets to the application layer, especially to an application that can process out-of-order packets to be presented to the user without compromising user experience.

In some embodiments, a block-acknowledgment technique is defined that supports out-of-order (OOO) packets processing as an additional mode to the existing IEEE 802.11 block-acknowledgment technique.

The existing IEEE 802.11 block-acknowledgment technique includes three operations or phases: a setup phase, a data transfer phase, and a teardown phase. During the setup phase, a transmitter and a receiver negotiate a block-acknowledgment agreement with relevant parameters (such as a block-acknowledgment policy, a traffic identifier or TID, buffer Size, etc.). Moreover, during the data transfer phase, the transmitter and the receiver coordinate closely as follows. The transmitter: encrypts MPDUs based on a counter mode cipher block chaining message authentication code protocol (CCMP) or a Galois/counter mode protocol (GCMP) cryptographic encapsulation operation; transmits the MPDUs, which may not in sequence, because they may include retransmitted frames; ensures the receiver reorder buffer is not overrun by limiting the sequence-number (SN or Seq. No.) range in which the acknowledgments are outstanding (based at least in part on the buffer size indicated in the setup phase); discards the MPDUs that have been acknowledged; requeues the MPDU that were not acknowledged for retransmission, if the time-to-live or TTL and retransmission count are still valid, and otherwise discards the MPDUs; and discards the MPDUs that were not asked for when their TTL has expired. In this case, the transmitter may send a block-acknowledgment request (BAR) to flush the receiver reorder buffer, so that subsequent MAC service data units (MSDUs) are not needlessly held up waiting for the sequence to be completed.

Moreover, the receiver: decrypts MPDUs based at least in part on CCMP/GCMP decapsulation operation; maintains a block acknowledgment record (e.g., the transmitter address, TID, a record of reorder buffer size indexed by the received MPDU sequence control value, etc.); holds frames in the reorder buffer until gaps in the sequence number slot are filled; reorders the held frames, reassembles them to complete an MSDU, and passes them in sequence to the upper layer; discards them if complete MSDUs cannot be reconstructed (notably, after exceeding the retries limit) to flush the reorder buffer to avoid overflow; maintains a scoreboard to track which MPDUs have been received correctly; and prepares a block-acknowledgment response by converting the scoreboard into a bitmap.

After the quality-of-service (QoS) data-block transfer, the transmitter sends a BAR that contains the sequence serial number or SSN (e.g., the earliest or the oldest MSDU) for which an acknowledgment is needed (note that the BAR also allows the transmitter to flush the reorder buffer of the receiver of incomplete MSDUs for which the retransmit lifetime has expired).

Furthermore, during the teardown phase, either the transmitter or the receiver can tear down the block-acknowledgment session.

The proposed communication techniques are applicable to a set of predefined TIDs in which OOO packet processing is allowed or can be handled by the applications. For example, a streaming TID is applicable to OOO packet processing, while a networking TID uses traditional in-order (TO) packet processing. Note that an existing IO packet processing implementation may not be impacted with the proposed communication techniques.

In the proposed communication techniques, the transmitter behavior may remain unchanged (e.g., the same behavior as in IEEE 802.11ad/ay) with the proposed communication techniques except that encryption may be perform differently, as described further below in the discussion of method 1. Moreover, the receiver behavior may remain unchanged (e.g., the same behavior as in IEEE 802.11ad/ay) except that: decryption may be performed differently, as described further below in the discussion of method 1; replay detection may be performed based at least in part on an OOP replay check block/module; and as soon as the received MPDU completes the MSDU, then the receiver may forward all the complete MSDUs in the buffer (which do not need to be in order) to the upper layer for the supported TIDs.

In order to support OOO packet processing, the communication techniques may include the following mechanisms to address reply attack(s). Notably, in method 1, the sequence number or SN from a received MPDU may be used (instead of the packet number or PN) in an AAD construction (during encryption). Moreover, in method 2, a lookup table that maintains an {SN, PN} pair for each successfully received packet may be constructed. Furthermore, in method 2, a range search may be performed in sequential order (alternative 1), or a brute-force search may be performed in sequential order (alternative 2).

Figure 26:
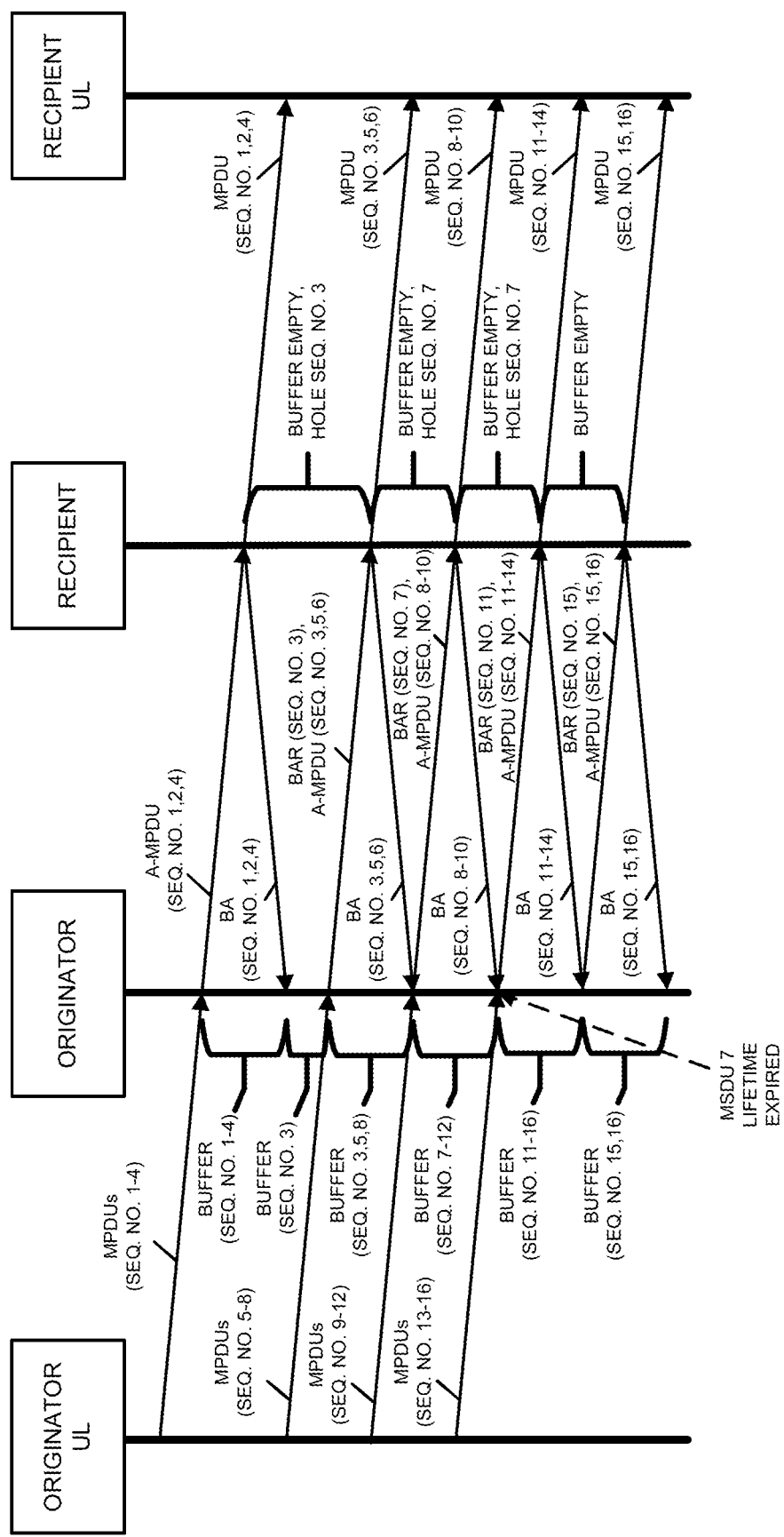
FIG. 26 is a drawing illustrating an example of communication between electronic devices of FIG. 1.

FIG. 26 presents a drawing illustrating an example of communication between electronic devices of FIG. 1. This embodiment, which is compatible with IEEE 802.11ad/ay block-acknowledgment with OOO processing, uses significant less memory buffer at the receiver than the existing block-acknowledgment techniques. Moreover, if a specific MPDU is missing (e.g., SN equal to 3 or 7), the receiver can pass the other complete MSDUs to the upper layer for processing. This may significantly improve the latency.

Figure 27:
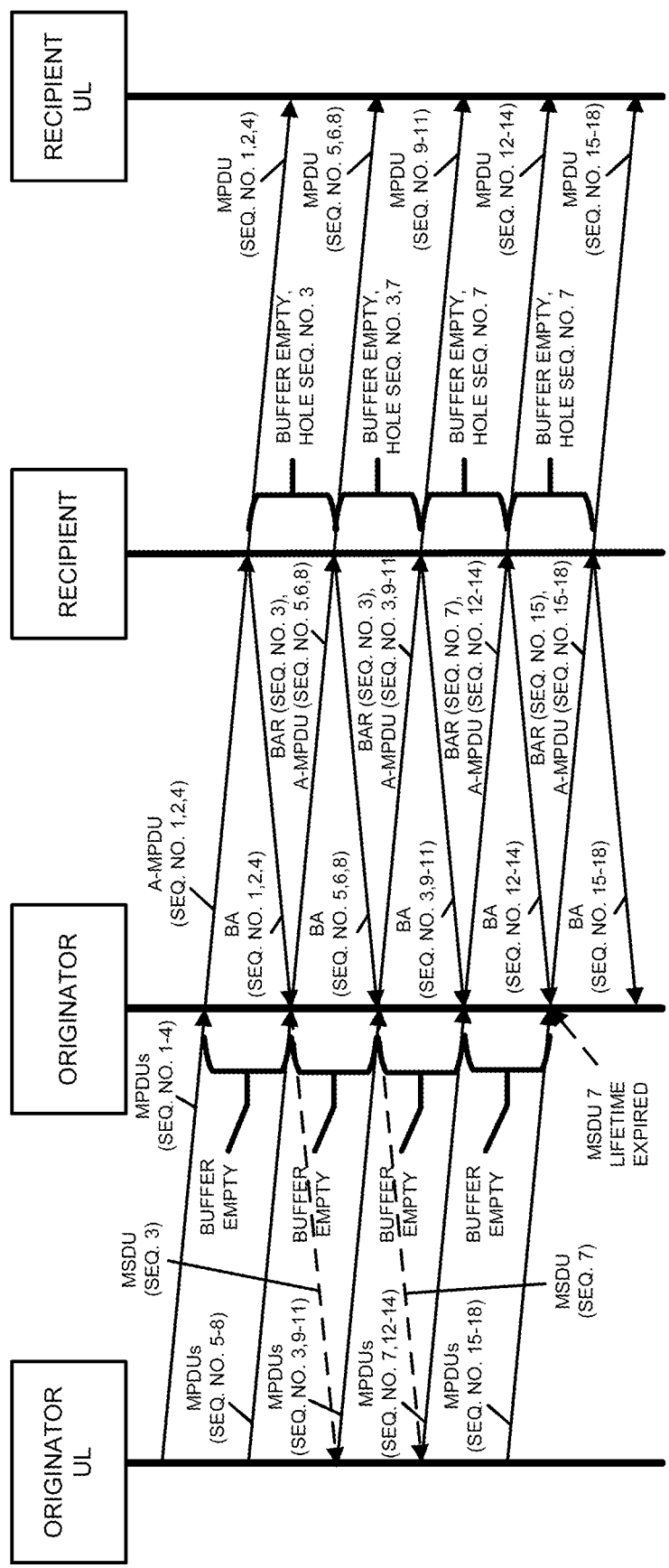
FIG. 27 is a drawing illustrating an example of communication between electronic devices of FIG. 1.

Furthermore, FIG. 27 presents a drawing illustrating an example of communication between electronic devices of FIG. 1. This embodiment, which is compatible with IEEE 802.11ay block-acknowledgment with OOO processing, uses significant less memory buffer at the transmitter and the receiver than the existing block-acknowledgment techniques. The latency may be significantly improved, because the MSDU is not held at the buffer in the receiver. Moreover, performance may be maintained if the application is able to do post-processing to compensate for the missing MSDU.

Figure 28:
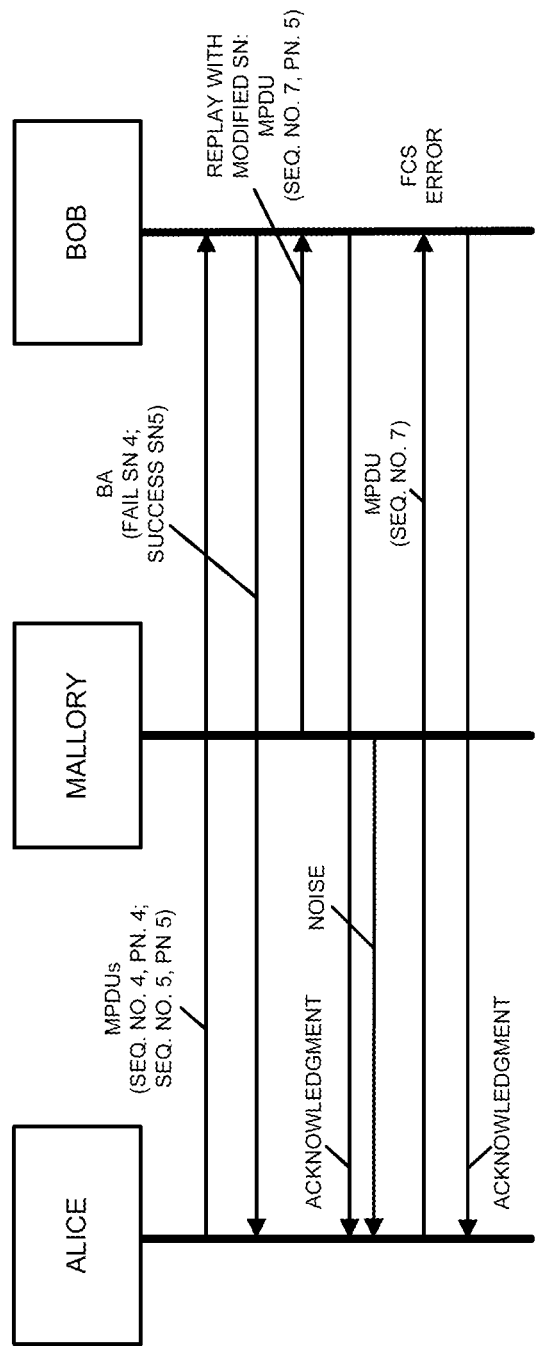
FIG. 28 is a drawing illustrating an example of communication between electronic devices of FIG. 1.

Additionally, FIG. 28 presents a drawing illustrating an example of communication between electronic devices of FIG. 1, which shows the challenge of detecting replay for OOO packets. Notably, an electronic device used by Alice may transmit packets with SN 4 and 5 to an electronic device used by Bob. The link may be encrypted and authenticated. However, SN 4 may not be received.

In the IN approach, SN 4 is buffered. The receiver waits for SN 4, keeping the last PN successfully received in order. Alternatively, in the OOO approach, keeping the last IN received PN will fail for replay on packets with higher SNs. Until the ordering is resolved, duplicate packets may have been received. For example, the man-in-the-middle (an electronic device used by Mallory) may resend PN 5, however replacing SN=5 to SN=7.

Note that SN is field is not authenticated. Consequently, because SN 7 was not previously received by Bob, Bob may process the packet. Moreover, Bob must detect the replay by inspecting received PNs for PN 5, even though PN 4 has not been received yet. The PNs must be generated in increasing order, but not necessarily increasing by one between two adjacent packets.

Figure 29:
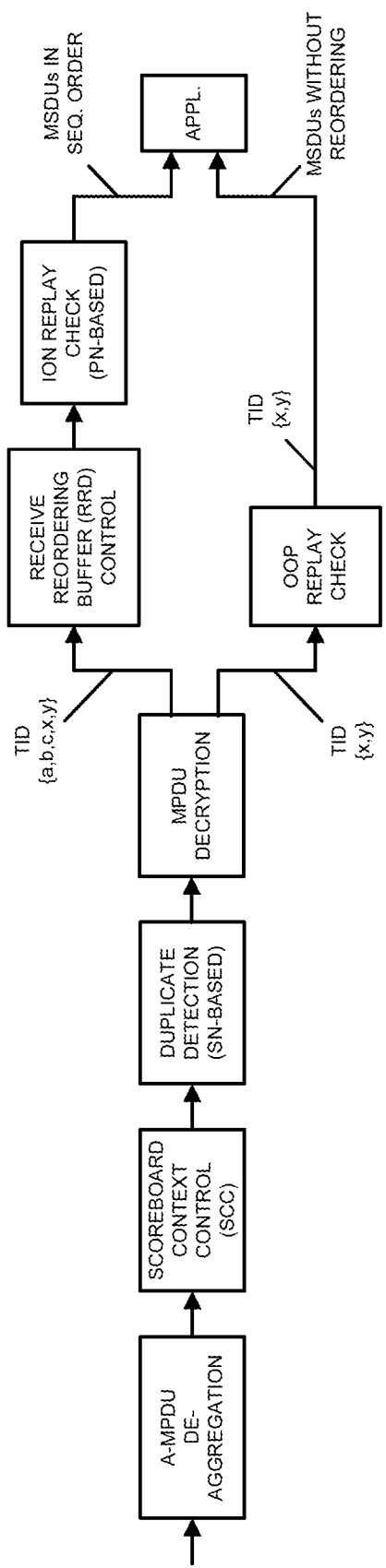
FIG. 29 is a block diagram illustrating an example of an electronic device of FIG. 1.

The receiver architecture with out-of-order packet (OOP) detection for a MPDU is shown in FIG. 29, which presents a block diagram illustrating an example of an electronic device of FIG. 1. Notably, TID{a, b, c} are streams in which the applications can only handle IN packet processing. Moreover, TID{x,y} are streams in which the applications may handle IN packet or OOP processing. OOP processing may be beneficial to the system performance, but is subject to the ability of the transmitter and the receiver to handle an OOP. Furthermore, MPDU decryption maybe based on AAD construction using the SN, which is described further below in the discussion of method 1. Additionally, the OOP replay check module/block operation may be used to detect a replay. For example, if the PN of the received MPDU is less than or equal to a replay counter Rc, then it is a replayed MPDU and may be discarded. Otherwise, Rc is updated with the PN from the received valid MPDU. This is described further below in the discussions of methods 1 and 2.

Figure 30:
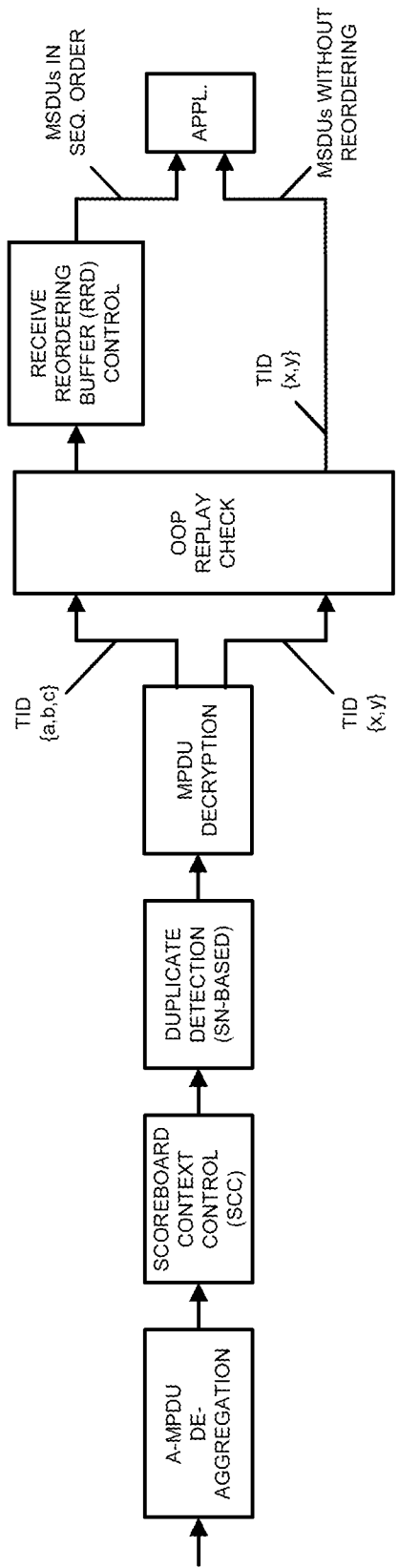
FIG. 30 is a block diagram illustrating an example of an electronic device of FIG. 1.

An alternative receiver architecture with OOP detection for a MPDU is shown in FIG. 30, which presents a block diagram illustrating an example of an electronic device of FIG. 1. Note that the difference between this receiver architecture and the one shown in FIG. 29 is that the IOP replay check is replaced by the OOP replay check, while keeping the sequential order operation unchanged in order to ensure backward compatibility.

In method 1, in order to overcome the replay attack issue when received MSDU/A-MSDU reordering is disabled, the following modifications may be made. Notably, in the encryption operation, the transmitter may: check the TID of the traffic/stream, if it is applicable for OOO packet processing; verify if the receiver is capable of handling OOO packet processing; use the SN (versus masking it to zero as in the existing approach used by IEEE 802.11ad/ay) as part of the AAD construction; and encrypt the MPDU as per clause 12.5.5.3 of IEEE 802.11-2016 with exception that the SN is not masked. Note that the use of the SN in the AAD construction may signal or indicate that the reordering of MSDU in sequence is not required and that the receiver may forward any complete MSDU (without sequential order) to the upper layer for processing.

Moreover, in the decryption operation, the receiver may: verify if the session is operating using OOO or IO packet processing; use the same SN (versus zero) to construct AAD for OOO packet processing; decrypt the encrypted MPDU per clause 12.5.5.4 of IEEE 802.11-2016 with exception that the SN is not masked; and check that the SN is not duplicated, and is monotonically increasing for all MPDUs received for all TIDs.

Furthermore, the OOP replay check operation may include: initializing an RRB array to PNs to the maximum PN value (e.g., all the bits may be set to '1'); and denoting RRB[k].PN as the PN of the $k^{th}$ entry. Additionally, for any received packet with {SN, PN}: SN mod may equal the SN modulo the WinSize; and if PN is less than or equal to RRB[SN mod].PN is less than the maximum PN value, signal a replayed packet; otherwise, RRB[SN mod].PN is assigned or set to PN.

In method 2, in order to overcome the replay attack issue when received MSDU/A-MSDU reordering is disabled, the following modifications are made. Notably, in the encryption operation, the transmitter: checks the TID of the traffic/stream, if it is applicable for OOO packet processing; verifies if the receiver is capable of handling OOO packet processing; and encrypts the MPDU as per clause 12.5.5.3 of IEEE 802.11-2016. Moreover, in the decryption operation, the receiver: verifies if the session is operating using OOO or IO packet processing; decrypts the encrypted MPDU per clause 12.5.5.4 of IEEE 802.11-2016; checks that the PN number is not duplicated, and is monotonically increasing for all MPDUs received for all TIDs; and stores the {SN, PN} paired index of the decrypted MPDU, including the last recorded {SN, PN} in the previous window, for use in the OOP replay check operation.

Furthermore, the OOP replay check operation performs a range search in sequential order for alternative 1.1 of method 2. Notably, the stored {SN, PN} paired indexes of the decrypted MPDUs are rearranged in ascending order. Then, {[SN{r,L}, SN{r,H}], [PN{r,L}, PN{r,H}]} is defined as the range of SN and PN value for the missing MPDUs. Note that SN{r,L} and SN{r,H} correspond to the lowest and highest SN value in the $r^{th}$ range, and PN{r,L} and PN{r,H} correspond to the lowest and highest PN value in the $r^{th}$ range. Moreover, PNm is denoted as the PN of the received MPDU with SNn, which is paired index as {SNn, PNm}. Furthermore, RH is denoted as the maximum number of range recorded within a window size. Additionally, for each received MPDU, which range the SNn of the received MPDU falls in ascending order is checked as follows: initialize R=0; for r=R+1, if SN{r,L}<SNn<SN{r,H} is TRUE AND PN{r,L}<PNm<PN{r,H} is TRUE, then the MPDU is a valid frame, forward to the application, go to EXIT; else R=R+1; end; if R>RH, go to EXIT; end; end; EXIT (replay detection completed). The MPDUs that complete MSDUs are forwarded to the application for processing.

Alternatively, the OOP replay check operation performs a range search based at least in part on WinStart and WinEnd for alternative 1.2 of method 2. Notably, the stored {SN, PN} paired indexes of the decrypted MPDUs are rearranged in ascending order. Then, an AMPDU window size array is maintained, where each element of the array contains the following fields: the SN of the received MPDU; the PN of the corresponding received SN; the largest SN in this block-acknowledgment window (denote as i) that is smaller than this SN and that was already received; and the smallest SN in this block-acknowledgment window (denote as j) that is large than this SN and that was already received. Moreover, the replay detection if performed as follows: if SN[k] was as already received, a duplicate frame is detected and drop the frame; else, set new PN to SN[k].PN; end; if (SN[SN[k].i].PN<SN[k].PN<SN[SN[k].j].PN, MPDU is a valid frame, forward to the application; else, a replay frame is detected and drop the frame; end; update the stored {SN, PN} paired indexes for each valid frame. Note that in case SN[k].i is pointing to the beginning of the window, use the window start PN. Furthermore, note that in case SN[k].j is pointing to the end of the window, do not compare with the PN of j.

In alternative 2 of method 2, a brute-force search is performed in sequential order. Then, the stored {SN, PN} paired indexes of the decrypted MPDUs are rearranged in ascending order. Note that K denotes the maximum number of the paired index, and PNm denotes the PN of the received MPDU with SNn, which is defined as a paired index as {SNn, PNm}. Moreover, for each received MPDU, the following operations are performed: for k=1:K; if SNk≠SNn is true, go to step X; else, exit because the MPDU is a duplicate frame; end; end; step X: for k=1:K; if PNk≠PNm is true, then the MPDU is a valid frame; else, exit because the MPDU is a replayed frame; end; end. The MPDUs that complete MSDUs are forwarded to the application for processing.

Note that the formats of packets or frames communicated during the communication techniques may include more or fewer bits or fields. Alternatively or additionally, the position of information in these packets or frames may be changed. Thus, the order of the fields may be changed.

While the preceding embodiments illustrate embodiments of the communication techniques using frequency sub-bands, in other embodiments the communication techniques may involve the concurrent use of different temporal slots, and/or or a combination of different frequency sub-bands, different frequency bands and/or different temporal slots.

As described herein, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

We now describe embodiments of an electronic device. FIG. 31 presents a block diagram of an electronic device 3100 (which may be a cellular telephone, a smartwatch, an access point, a wireless speaker, an IoT device, another electronic device, etc.) in accordance with some embodiments. This electronic device includes processing subsystem 3110, memory subsystem 3112 and networking subsystem 3114. Processing subsystem 3110 includes one or more devices configured to perform computational operations. For example, processing subsystem 3110 can include one or more microprocessors, application-specific integrated circuits (ASICs), microcontrollers, graphics processing units (GPUs), programmable-logic devices, and/or one or more digital signal processors (DSPs).

Memory subsystem 3112 includes one or more devices for storing data and/or instructions for processing subsystem 3110, and/or networking subsystem 3114. For example, memory subsystem 3112 can include dynamic random access memory (DRAM), static random access memory (SRAM), a read-only memory (ROM), flash memory, and/or other types of memory. In some embodiments, instructions for processing subsystem 3110 in memory subsystem 3112 include: program instructions or sets of instructions (such as program instructions 3122 or operating system 3124), which may be executed by processing subsystem 3110. For example, a ROM can store programs, utilities or processes to be executed in a non-volatile manner, and DRAM can provide volatile data storage, and may store instructions related to the operation of electronic device 3100. Note that the one or more computer programs may constitute a computer-program mechanism, a computer-readable storage medium or software. Moreover, instructions in the various modules in memory subsystem 3112 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 3110. In some embodiments, the one or more computer programs are distributed over a network-coupled computer system so that the one or more computer programs are stored and executed in a distributed manner.

In addition, memory subsystem 3112 can include mechanisms for controlling access to the memory. In some embodiments, memory subsystem 3112 includes a memory hierarchy that comprises one or more caches coupled to a memory in electronic device 3100. In some of these embodiments, one or more of the caches is located in processing subsystem 3110.

In some embodiments, memory subsystem 3112 is coupled to one or more high-capacity mass-storage devices (not shown). For example, memory subsystem 3112 can be coupled to a magnetic or optical drive, a solid-state drive, or another type of mass-storage device. In these embodiments, memory subsystem 3112 can be used by electronic device 3100 as fast-access storage for often-used data, while the mass-storage device is used to store less frequently used data.

Networking subsystem 3114 includes one or more devices configured to couple to and communicate on a wired and/or wireless network (i.e., to perform network operations), such as: control logic 3116, one or more interface circuits 3118 and a set of antennas 3120 (or antenna elements) in an adaptive array that can be selectively turned on and/or off by control logic 3116 to create a variety of optional antenna patterns or 'beam patterns.' Alternatively, instead of the set of antennas, in some embodiments electronic device 3100 includes one or more nodes 3108, e.g., a pad or a connector, which can be coupled to the set of antennas 3120. Thus, electronic device 3100 may or may not include the set of antenna 3120s. For example, networking subsystem 3114 can include a Bluetooth™ networking system, a cellular networking system (e.g., a 3G/4G/5G network such as UMTS, LTE, etc.), a universal serial bus (USB) networking system, a networking system based on the standards described in IEEE 802.12 (e.g., a Wi-Fi® networking system), an Ethernet networking system, and/or another networking system.

In some embodiments, networking subsystem 3114 includes one or more radios, such as a wake-up radio that is used to receive wake-up frames and wake-up beacons, and a main radio that is used to transmit and/or receive frames or packets during a normal operation mode. The wake-up radio and the main radio may be implemented separately (such as using discrete components or separate integrated circuits) or in a common integrated circuit.

Networking subsystem 3114 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 3100 may use the mechanisms in networking subsystem 3114 for performing simple wireless communication between the electronic devices, e.g., transmitting advertising or frame frames and/or scanning for advertising frames transmitted by other electronic devices.

Within electronic device 3100, processing subsystem 3110, memory subsystem 3112 and networking subsystem 3114 are coupled together using bus 3128 that facilitates data transfer between these components. Bus 3128 may include an electrical, optical, and/or electro-optical connection that the subsystems can use to communicate commands and data among one another. Although only one bus 3128 is shown for clarity, different embodiments can include a different number or configuration of electrical, optical, and/or electro-optical connections among the sub systems.

In some embodiments, electronic device 3100 includes a display subsystem 3126 for displaying information on a display, which may include a display driver and the display, such as a liquid-crystal display, a multi-touch touchscreen, etc. Display subsystem 3126 may be controlled by processing subsystem 3110 to display information to a user (e.g., information relating to incoming, outgoing, or an active communication session).

Electronic device 3100 can also include a user-input subsystem 3130 that allows a user of the electronic device 3100 to interact with electronic device 3100. For example, user-input subsystem 3130 can take a variety of forms, such as: a button, keypad, dial, touch screen, audio input interface, visual/image capture input interface, input in the form of sensor data, etc.

Electronic device 3100 can be (or can be included in) any electronic device with at least one network interface. For example, electronic device 3100 may include: a cellular telephone or a smartphone, a tablet computer, a laptop computer, a notebook computer, a personal or desktop computer, a netbook computer, a media player device, a wireless speaker, an IoT device, an electronic book device, a MiFi® device, a smartwatch, a wearable computing device, a portable computing device, a consumer-electronic device, a vehicle, a door, a window, a portal, an access point, a router, a switch, communication equipment, test equipment, as well as any other type of electronic computing device having wireless communication capability that can include communication via one or more wireless communication protocols.

Although specific components are used to describe electronic device 3100, in alternative embodiments, different components and/or subsystems may be present in electronic device 3100. For example, electronic device 3100 may include one or more additional processing subsystems, memory subsystems, networking subsystems, and/or display subsystems. Additionally, one or more of the subsystems may not be present in electronic device 3100. Moreover, in some embodiments, electronic device 3100 may include one or more additional subsystems that are not shown in FIG. 31. In some embodiments, electronic device may include an analysis subsystem that performs at least some of the operations in the communication techniques. Also, although separate subsystems are shown in FIG. 31, in some embodiments some or all of a given subsystem or component can be integrated into one or more of the other subsystems or component(s) in electronic device 3100. For example, in some embodiments program instructions 3122 are included in operating system 3124 and/or control logic 3116 is included in the one or more interface circuits 3118.

Moreover, the circuits and components in electronic device 3100 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 3114. This integrated circuit may include hardware and/or software mechanisms that are used for transmitting wireless signals from electronic device 3100 and receiving signals at electronic device 3100 from other electronic devices. Aside from the mechanisms herein described, radios are generally known in the art and hence are not described in detail. In general, networking subsystem 3114 and/or the integrated circuit can include any number of radios. Note that the radios in multiple-radio embodiments function in a similar way to the described single-radio embodiments.

In some embodiments, networking subsystem 3114 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII), Electronic Design Interchange Format (EDIF), OpenAccess (OA), or Open Artwork System Interchange Standard (OASIS). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 3122, operating system 3124 (such as a driver for an interface circuit in networking subsystem 3114) or in firmware in an interface circuit networking subsystem 3114. Alternatively or additionally, at least some of the operations in the communication techniques may be implemented in a physical layer, such as hardware in an interface circuit in networking subsystem 3114. In some embodiments, the communication techniques are implemented, at least in part, in a MAC layer and/or in a physical layer in an interface circuit in networking subsystem 3114.

While examples of numerical values are provided in the preceding discussion, in other embodiments different numerical values are used. Consequently, the numerical values provided are not intended to be limiting.

Moreover, while the preceding embodiments illustrated the use of wireless signals in one or more bands of frequencies, in other embodiments of the communication techniques electromagnetic signals in one or more different frequency bands are used to determine the range. For example, these signals may be communicated in one or more bands of frequencies, including: a microwave frequency band, a radar frequency band, 900 MHz, 2.4 GHz, 5 GHz, 6 GHz, 60 GHz, and/or a band of frequencies used by a Citizens Broadband Radio Service or by LTE.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
a node configured to communicatively couple to an antenna; and
an interface circuit, communicatively coupled to the node, configured to communicate with a recipient electronic device via multiple links between the electronic device and the recipient electronic device, wherein the interface circuit is configured to:
transmit, from the node, frames addressed to the recipient electronic device and associated with the links;
receive, at the node, block acknowledgments for at least a subset of the frames, wherein a given block acknowledgment is associated with the recipient electronic device and indicates received frames on a given link in the links, and wherein the block acknowledgments correspond to selective reordering of at least the subset of the frames in the recipient electronic device based at least in part on a block-acknowledgment configuration that specifies whether the reordering is performed;
control an amount of traffic conveyed on the links based at least in part on the block acknowledgments; and
store a remainder of the frames based at least in part on the block acknowledgments, wherein the frames comprise the subset of the frames and the remainder of the frames.

2. The electronic device of claim 1, wherein the given block acknowledgment specifies a lowest sequence number associated with the received frames that have been selectively reordered.

3. The electronic device of claim 2, wherein the amount of traffic conveyed on the links is controlled based at least in part on the selective reordering.

4. The electronic device of claim 2, wherein sizes of the frames correspond to the selective reordering.

5. The electronic device of claim 1, wherein the remainder of the frames are stored in a buffer and a size of the buffer is equal to or larger than a size of a largest block acknowledgment.

6. The electronic device of claim 1, wherein the block acknowledgments are independent of each other.

7. The electronic device of claim 1, wherein the amount of traffic is controlled with at least a transmission window.

8. The electronic device of claim 7, wherein each link has a separate transmission window.

9. The electronic device of claim 1, wherein the frames have a common traffic identifier.

10. The electronic device of claim 9, wherein the interface circuit is configured to:
transmit, from the node, a block-acknowledgment setup request addressed to the recipient electronic device, wherein the block-acknowledgment setup request is associated with the traffic identifier; and
receive, at the node, a block-acknowledgment setup response associated with the recipient electronic device, wherein the block-acknowledgment configuration is specified by the block-acknowledgment setup request and the block-acknowledgment setup response.

11. The electronic device of claim 1, wherein the frames comprise: media access control (MAC)-level sequence numbers; or application-level sequence numbers.

12. The electronic device of claim 1, wherein the frames are associated with an aggregate-media access control (MAC) protocol data unit (A-MPDU).

13. The electronic device of claim 1, wherein the interface circuit is configured to: transmit, from the node, a block-acknowledgment request that requests the block acknowledgments; or to request the block acknowledgments by setting a bit in the frames.

14. An integrated circuit, comprising:
a node configured to communicatively couple to an antenna; and
a communication circuit, communicatively coupled to the node, configured to communicate with a recipient electronic device via multiple links between the integrated circuit and the recipient electronic device, wherein the communication circuit is configured to:
transmit, from the node, frames addressed to the recipient electronic device and associated with the links;
receive, at the node, block acknowledgments for at least a subset of the frames, wherein a given block acknowledgment is associated with the recipient electronic device and indicates received frames on a given link in the links, and wherein the block acknowledgments correspond to selective reordering of at least the subset of the frames in the recipient electronic device based at least in part on a block-acknowledgment configuration that specifies whether the reordering is performed;

control an amount of traffic conveyed on the links based at least in part on the block acknowledgments; and store a remainder of the frames based at least in part on the block acknowledgments, wherein the frames comprise the subset of the frames and the remainder of the frames.

15. A recipient electronic device, comprising:

a node configured to communicatively couple to an antenna; and an interface circuit, communicatively coupled to the node, configured to communicate with an electronic device via multiple links, wherein the interface circuit is configured to:

receive, at the node, frames associated with the electronic device and associated with the links; and transmit, from the node, block acknowledgments for the frames, wherein a given block acknowledgment is addressed to the electronic device and indicates received frames on a given link in the links, and wherein the interface circuit is configured to selectively reorder the frames based at least in part on sequence numbers associated with the frames and a block-acknowledgment configuration that specifies whether the reordering is performed.

16. The recipient electronic device of claim 15, wherein the given block acknowledgment specifies a lowest sequence number associated with the received frames that have been selectively reordered.

17. The recipient electronic device of claim 15, wherein the interface circuit is configured to:

receive, at the node, second frames associated with a second electronic device and having a source address of the electronic device; and combine the frames and the second frames, and wherein the frames and the second frames have different traffic identifiers.

18. The recipient electronic device of claim 17, wherein the interface circuit is configured to:

receive, at the node, a block-acknowledgment setup request associated with the electronic device, wherein the block-acknowledgment setup request is associated with the traffic identifier; and transmit, from the node, a block-acknowledgment setup response addressed to the electronic device.

19. The recipient electronic device of claim 15, wherein the recipient electronic device is configured to:

remove duplicate frames in the frames; and decrypt the frames, wherein the decryption is configured to ensure that the frames correspond a consecutive sequence of packet numbers.

20. The recipient electronic device of claim 15, wherein the recipient electronic device is configured to:

remove duplicate frames in the frames;

decrypt the frames to obtain packets; and sequentially reorder the packets based at least in part on packet numbers associated with the packets.

* * * * *